United States Patent [19]
Sawamura et al.

[11] Patent Number: 5,756,215
[45] Date of Patent: May 26, 1998

[54] CERAMIC HEATER

[75] Inventors: Kentaro Sawamura; Nobuyuki Miki; Masahiro Kitajima; Etsuo Mitsuhashi, all of Chiba; Masatada Yodogawa, Tokyo; Shinichi Sato, Chiba; Akio Okamura, Chiba; Ryoichi Kondo, Chiba, all of Japan

[73] Assignee: TDK Corporation, Tokyo, Japan

[21] Appl. No.: 272,393

[22] Filed: Jul. 20, 1994

[30] Foreign Application Priority Data

| Jul. 20, 1993 | [JP] | Japan | 5-200314 |
| Apr. 28, 1994 | [JP] | Japan | 6-114459 |
| Apr. 28, 1994 | [JP] | Japan | 6-114460 |
| Apr. 28, 1994 | [JP] | Japan | 6-114461 |
| Apr. 28, 1994 | [JP] | Japan | 6-114462 |
| Apr. 28, 1994 | [JP] | Japan | 6-114463 |

[51] Int. Cl.$^6$ ................................. B32B 9/04
[52] U.S. Cl. ............ 428/446; 428/450; 428/698; 428/699; 428/701; 428/702
[58] Field of Search ................. 428/699, 446, 428/701, 450, 702, 698; 361/257

[56] References Cited

U.S. PATENT DOCUMENTS

| 4,598,676 | 7/1986 | Ito et al. | 123/145 A |
| 4,644,133 | 2/1987 | Atsumi et al. | 219/270 |
| 5,191,508 | 3/1993 | Axelson et al. | 361/257 |

FOREIGN PATENT DOCUMENTS

| 3342753 | 5/1984 | Germany . |
| 3512483 | 10/1985 | Germany . |
| 3519437 | 12/1985 | Germany . |
| 61-104581 | 5/1986 | Japan . |
| 62-82685 | 4/1987 | Japan . |
| 1 28467 | 6/1989 | Japan . |
| 2 10557 | 3/1990 | Japan . |
| 4 52598 | 8/1992 | Japan . |
| 4 61832 | 10/1992 | Japan . |
| 6 7510 | 1/1994 | Japan . |

*Primary Examiner*—Timothy Speer
*Attorney, Agent, or Firm*—Oblon, Spivak, McClelland, Maier & Neustadt, P.C.

[57] ABSTRACT

A rectangular plate shaped rapid temperature rise heater element includes a sintered insulating ceramic layer, an exothermic section, and first and second lead layers for applying voltage across the exothermic section to develop heat. Typically the sintered insulating ceramic layer, exothermic section, and lead layers are formed of ceramic compositions composed mainly of an identical insulating component in the form of a metal oxide, typically $Al_2O_3$ and an identical conductive component in the form of a metal silicide and/or carbide, typically $MoSi_2$, blended in different ratios for the respective layers. The heater element is easy and inexpensive to manufacture, capable of rapid heating, and durable.

22 Claims, 10 Drawing Sheets

CERAMIC HEATER

BACKGROUND OF THE INVENTION

1. Field of the Invention

This invention relates to a ceramic heater element, typically a rapid temperature rise heater element, a method for preparing the same, a method for forming a silicon oxide protective film on a silicide-containing conductive material used in a ceramic heater element, and a doctor blade apparatus and method for preparing a green sheet for use in the manufacture of a ceramic heater element.

2. Prior Art

Rapid temperature rise heater elements are disclosed in Japanese Patent Publication (JP-B) Nos. 28467/1989 and 61832/1992, for example. The rapid temperature rise heater element disclosed in JP-B 28467/1989 constitutes a glow plug for use in automotive Diesel engines. It is prepared by charging a hot press mold with a source powder of silicon carbide (SiC) having a well-known sintering aid (e.g., $B_4C$ and $Al_2O_3$) added thereto, placing a linear body having a linear heater section of a high-melting metal material mainly of tungsten, molybdenum or the like on the source powder at a predetermined position, further feeding the source powder thereon to bury the linear body, and firing under pressure at about 2,000° C. by a hot press method. Voltage is applied across the exposed ends of the linear body to generate heat.

The rapid temperature rise heater element disclosed in JPB B 61832/1992 is an electric resistor which is as a whole constructed from 30 to 70% by volume of a nitride selected from the group consisting of silicon nitride, aluminum nitride, boron nitride, and mixtures thereof, 10 to 45% by volume of silicon carbide, and 5 to 50% by volume of molybdenum disilicide, has a density of at least 85% of the theoretical density, and includes an exothermic zone and a non-exothermic zone having different compositions. More particularly, a material providing a high resistance upon sintering and another material providing a low resistance upon sintering are formed as two layers which are hot press fired. The sintered body is machined in a direction perpendicular to the direction of the layers to provide a U shape. Voltage is applied across the two free legs of the U shape whereby heat is generated at the connecting portion.

The rapid temperature rise heater element of JP-B 28467/1989 is prepared by hot press firing the source ceramic powder and the linear body such that the linear body serving as a heater is buried in the ceramic compact. Then heater elements must be manufactured one by one in a substantial sense. The manufacturing process is less efficient and takes a long time. This is also undesirable for cost. And the buried heater is low in thermal efficacy as compared with a heater exposed at the surface of a structure.

Also the rapid temperature rise heater element of JP-B 61832/1992 is prepared by machining a sintered conductive body of two layers having different resistance values into a redetermined shape, typically a U shape. Since the sintered ceramic material has high hardness, machining of such high hardness material requires a substantial cost and is less efficient.

A similar ceramic heater is known from Japanese Patent Application Kokai (JP-A) No. 104581/1986. Also in this case, ceramic heaters must be manufactured one by one since they are U shaped. The manufacturing process is less efficient and expensive.

Prior art ceramic heaters have the problems that they tend to crack due to thermal impact if used as rapid temperature rise heater elements to provide a temperature rise rate of less than about 10 seconds from room temperature to 1,000° C. or 1,500° C., and that they are less durable in that their electrical resistance deteriorates during long term operation.

Ceramic heater elements like rapid temperature rise heater elements for gas ignition often use oxidation resistant molybdenum disilicide to form an exothermic section. However, molybdenum disilicide exhibits electroconductive properties like metal. That is, when heated at elevated temperatures of higher than 1,000° C., its electrical resistance becomes higher than the resistance at room temperature by a factor of 3.5 or more. Thus molybdenum disilicide rather obstructs rapid temperature rise.

This problem is overcome by adding silicon carbide SiC. However, a ceramic material having SiC admixed therein becomes difficult to sinter and requires hot press firing. Then the firing process becomes less productive. Firing results in a very hard sintered body which must be subject to machining, for example, processing into an element shape. Cost reduction is difficult for these reasons. The addition of SiC has another problem that SiC which is a semiconductor can react with impurities in element-forming ceramic material. It is then difficult to control the resistance value of the element. The element is unstable since a resistance change occurs during use.

Further, since ceramic heater elements like rapid temperature rise heater elements for gas ignition are directly exposed to flame over a long time, it is recommended that molybdenum disilicide and other conductors used in the exothermic section be coated at the outer surface with a protective film which is chemically and thermally stable, heat resistant and oxidation resistant. One prior art method for forming a protective film on a silicide conductor is by firing a silicide conductor in a furnace in a non-oxidizing atmosphere, typically argon, to form a sintered body, and exposing the sintered body to an oxidizing atmosphere at high temperature for a predetermined time, thereby forming a silicon oxide protective film on the surface of the conductor. Therefore the prior art method of forming a ceramic heater element having a silicon oxide protective film required two heat treatments, firing in a non-oxidizing atmosphere and firing in an oxidizing atmosphere, resulting in cumbersome manufacture. The silicon oxide protective film has another problem of cumbersome manufacture in that when terminal electrodes are attached to the sintered body, unnecessary ortions of the silicon oxide protective film must be removed as by grinding or machining.

As previously described, molybdenum disilicide is often used in ceramic heater elements like rapid temperature rise heater elements for gas ignition since it has excellent electrical properties such as temperature dependency of resistance and chemical stability such as oxidation resistance. However, molybdenum disilicide is a non-oxide ceramic substance and less adhesive to electrode metal. No sufficient bond is established when electrodes are formed by coating and baking conventional silver paste. Therefore, for conventional molybdenum disilicide heater elements, electrodes of metallic aluminum are formed by aluminizing processes including evaporation and thermal spraying. Aluminum is a good electric conductor and thus form satisfactory electrodes, but has a relatively low melting point of 650° C. and is less resistant against heat. Then careful design must be made to position the electrodes remote from the exothermic section such that the electrodes may not be heated to high temperature. This results in elements being undesirably increased in length.

In general, ceramic rapid temperature rise heater elements include exothermic sections which can be cracked or broken by thermal expansion upon rapid temperature rise. This problem is aggravated by the use of molybdenum disilicide having a higher coefficient of thermal expansion.

In the prior art, multi-layer ceramic electric or electronic parts are generally fabricated by previously preparing a plurality of ceramic green sheets, stacking the sheets and firing the stacked sheets. It is sometimes desirable that a ceramic sheet has two or more regions of different compositions or different materials. Such a ceramic sheet is fabricated by separately forming green webs of different compositions by a doctor blade technique or the like, cutting the webs into strips of a predetermined width, and joining the strips to form a ceramic green sheet. Joining of the ceramic green strips cannot be achieved simply by abut joint. In the prior art, the ceramic green strips along their sides to be joined are cut to high precision and joined together into an integral sheet by thermo-compression bonding. The sheet is then fired. The manufacturing process is thus cumbersome. The resulting sheet is less reliable in that the strips joined therein can be separated or cracked at their joint due to thermal cycling.

OBJECTS OF THE INVENTION

A first object of the present invention is to provide a ceramic heater element which can be manufactured in an efficient and inexpensive manner and is durable while still retaining rapid heater performance and a method for manufacturing the same.

A second object of the present invention is to provide a ceramic heater element which is easy to control its electrical resistance value, experiences minimal variation of resistance during operation, and features low cost and high performance.

A third object of the present invention is to provide a simple method for forming a silicon oxide protective film and a ceramic heater element having a silicon oxide protective film formed by the method.

A fourth object of the present invention is to provide a ceramic heater element based on a molybdenum disilicide material and having terminal electrodes which are heat resistant and well bondable and a method for manufacturing the same.

A fifth object of the present invention is to provide a ceramic heater element which is improved in structure to mitigate stresses induced by thermal expansion so as to restrain crack occurrence and failure and a method for manufacturing the same.

A sixth object of the present invention is to provide a doctor blade apparatus which can manufacture a ceramic green sheet including two or more substantially integrally joined regions of different compositions or materials and a method for manufacturing such a ceramic green sheet.

SUMMARY OF THE INVENTION

Briefly stated, a rapid temperature rise heater element according to the present invention includes a generally rectangular sintered insulating ceramic layer having first and second opposed major surfaces and longitudinally opposed ends. An exothermic section extends from the first to the second major surfaces of the sintered insulating ceramic layer across one end thereof and is formed of a high resistance conductive ceramic material. First and second lead layers are disposed on the first and second opposed major surfaces of the sintered insulating ceramic layer, respectively, in contact with the exothermic section and formed from a low resistance conductive material. A voltage is applicable across the exothermic section through the first and second lead layers whereby the exothermic section develops heat.

In a first form, the present invention provides a rapid temperature rise heater element comprising a sintered insulating ceramic layer having opposite major surfaces, an exothermic section, and first and second lead layers. The exothermic section includes first and second sintered high resistance conductive ceramic layers formed on the sintered insulating ceramic layer by applying a high resistance conductive ceramic material to at least portions of the opposite major surfaces thereof, respectively, and a connecting portion formed integrally with the first and second sintered high resistance conductive ceramic layers from the high resistance conductive ceramic material, an electric current path extending from the first to the second sintered high resistance conductive ceramic layer through the connecting portion. The first and second lead layers are disposed on the same opposite major surfaces as the first and second sintered high resistance conductive ceramic layers or at least portions of the surfaces of the first and second sintered high resistance conductive ceramic layers and electrically connected to the first and second sintered high resistance conductive ceramic layers, the first and second lead layers each being a sintered conductive ceramic layer formed from a low resistance conductive ceramic material. Preferably, the element is dimensioned about 100 to 2,000 μm thick, about 200 to 5,000 μm wide, and about 15 to 70 mm long. The sintered insulating ceramic layer and the first and second sintered high resistance conductive ceramic layers each have a thickness of about 1 to 1,000 μm. The exothermic section has a total thickness of about 100 to 2,000 μm.

The present invention also provides a rapid temperature rise heater element comprising a sintered insulating ceramic layer, an exothermic section joined to the sintered insulating ceramic layer, and first and second lead layers for applying voltage across the exothermic section. The sintered insulating ceramic layer, the exothermic section, and the lead layers are formed of ceramic compositions composed mainly of a first insulating component in the form of an identical metal oxide and a second conductive component in the form of an identical metal silicide and/or carbide, the first and second components being blended in a volume ratio of from 10:0 to 8:2 for the sintered insulating ceramic layer, from 7.5:2.5 to 5.5:4.5 for the exothermic section, and from 5:5 to 0:10 for the lead layers.

Preferably, the metal oxide is selected from the group consisting of aluminum oxide, zirconium oxide, chromium oxide, titanium oxide, tantalum oxide, silicon oxide, magnesium aluminum oxide, silicon aluminum oxide and mixtures thereof, the metal silicide is selected from the group consisting of molybdenum silicide, tungsten silicide, and chromium silicide and mixtures thereof, and the metal carbide is selected from the group consisting of silicon carbide and titanium carbide and mixtures thereof.

Preferably, at least one of the sintered insulating ceramic layer, the exothermic section, and the lead layers contains up to 10% by weight of an alkaline earth metal oxide, yttrium oxide or rare earth metal oxide.

The heater element may further include a protective film covering the outer surface of the element, the protective film being chemically and thermally stable, heat resistant, and oxidation resistant and formed of at least one of silica, alumina and chromia.

Preferably, at least one of the sintered insulating ceramic layer, the exothermic section, and the lead layers contains up to 2% by weight of silicon carbide.

Preferably, the connecting portion includes at least three layers, among which an intermediate layer has a greater electrical resistance than outside layers. Preferably, the intermediate layer has a thickness which is substantially equal to or different within ±20% from the thickness of the sintered insulating ceramic layer and is formed contiguous to the edge of the sintered insulating ceramic layer.

Preferably, the first and second lead layers have an electrical resistance which is not greater than $1/10$ of the resistance of the exothermic section.

The rapid temperature rise heater element mentioned above is prepared by a method comprising the steps of: forming the sintered insulating ceramic layer, the exothermic section, and the first and second lead layers as layers all in a green state, stacking the layers, and firing the layers.

In a second form, the present invention provides a rapid temperature rise heater element comprising an exothermic section which is formed of a sintered ceramic composition containing a molybdenum silicide-aluminum oxide mix material having a resistivity of $1\times10^{-2}$ to $5\times10^0$ Ωcm as a major component and 0.01 to 10% by volume, preferably 0.05 to 5% by volume of at least one additive selected from the group consisting of carbides of Zr, W, Ta, Ti, Nb, Hf, and Mo.

Preferably, when the ratio R of the resistivity of the exothermic section at a temperature of at least 1,000° C. to the resistivity of the exothermic section at 20° C. is plotted on the ordinate and the element temperature T (°C.) is plotted on the abscissa of a diagram, the exothermic section has a temperature coefficient of resistance falling within the region defined and encompassed by the line R=T/1000 and the line R=3T/1000 in the diagram.

The heater element may further includes a protective film covering the outer surface of the element, the protective film being chemically and thermally stable, heat resistant, and oxidation resistant and formed of at least one of silica, alumina and chromia.

In a third form, the present invention provides a method for forming a silicon oxide protective film on a conductor containing a silicide, comprising the step of conducting electricity through the silicide-containing conductor in an oxidizing atmosphere for a predetermined time so that the conductor itself is heated to a temperature of at least 1,000° C., thereby forming a dense silicon oxide protective film on the surface of the conductor. Preferably, the temperature to which the conductor is heated by electric conduction is higher than the temperature to which the conductor will heat up during use. During the electric conduction, the conductor is preferably maintained in a non-oxidizing atmosphere while the conductor is at a temperature in the range of °400 to 800° C.

The present invention also provides a rapid temperature rise heater element comprising a sintered insulating ceramic layer having opposite major surfaces; an exothermic section including first and second sintered high resistance conductive ceramic layers formed on the sintered insulating ceramic layer by applying a high resistance conductive ceramic material to at least portions of the opposite major surfaces thereof, respectively, and a connecting portion formed integrally with the first and second sintered high resistance conductive ceramic layers from the high resistance conductive ceramic material, an electric current path extending from the first to the second sintered high resistance conductive ceramic layer through the connecting portion; and first and second lead layers disposed on the same opposite major surfaces as the first and second sintered high resistance conductive ceramic layers or at least portions of the surfaces of the first and second sintered high resistance conductive ceramic layers and electrically connected to the first and second sintered high resistance conductive ceramic layers, the first and second lead layers each being a sintered conductive ceramic layer formed from a low resistance conductive material, wherein the conductive ceramic material contains a silicide and correspond to the conductor recited above, the exothermic section has a silicon oxide protective film formed thereon by the above-defined method, and the silicon oxide protective film formed by self-heating extends only on the exothermic section and those portions of the first and second lead layers contiguous thereto.

In a fourth form, the present invention provides a molybdenum silicide system material element comprising a main body of a material composed mainly of molybdenum silicide and a terminal electrode attached thereto of an electrode material containing a first component selected from the group consisting of Mo, W, and Si and mixtures thereof and a second component selected from the group consisting of Fe, Co, and Ni and mixtures thereof.

Preferably, the electrode material contains Mo in an amount of 70 to 100% by weight of the first component and the second component in an amount of 30 to 90% by weight of the total weight of the electrode material and in this embodiment, the terminal electrode is formed by baking the electrode material to the main body at a temperature in the range of 1,050° to 1,400° C. In another preferred embodiment, the electrode material contains W in an amount of 70 to 100% by weight of the first component and the second component in an amount of 18 to 83% by weight of the total weight of the electrode material, and the terminal electrode is formed by baking the electrode material to the main body at a temperature in the range of 1,100° to 1,450° C. In a further preferred embodiment, the electrode material contains Si in an amount of 70 to 100% by weight of the first component and the second component in an amount of 65 to 97% by weight of the total weight of the electrode material and the terminal electrode is formed by baking the electrode material to the main body at a temperature in the range of 950° to 1,300° C. In all these embodiments, the electrode material may contain Ni in an amount of 70 to 100% by weight of the second component.

In a fifth form, the present invention provides a rapid temperature rise heater element having opposite ends, comprising an insulating ceramic layer, a resistance body joined to the insulating layer, and a pair of electrodes disposed at one end, wherein the resistance body defines an exothermic section at the other end, and the exothermic section is provided with means for relieving stresses, the stress relieving means including at least one slit or a plurality of small apertures. Preferably the stress relieving means is at least one slit extending along a current path which extends through the resistance body between the electrodes.

Such a rapid temperature rise heater element is prepared by a method comprising the steps of forming the insulating ceramic layer and the resistance body as layers in a green state, stacking the layers, forming the stress relieving means in the stack, and firing the stack.

In a sixth form, the present invention provides a doctor blade apparatus for applying ceramic slurry to a base film traveling in one horizontal direction, comprising a container disposed on the base film, the container having vertical walls defining a generally rectangular shape in a horizontal cross section, a doctor blade associated with that wall of the container disposed on the downstream side with respect to the traveling direction of the base film, the container being partitioned into at least two slurry receiving compartments by at least one partition disposed in the container and extending in the traveling direction of the base film, the partition including a downstream end portion having a transverse width which is tapered in the traveling direction of the base film, feed means for feeding slurry to the compartments, detector means associated with the respective compartments for detecting the level of slurry therein, and means associated with the feed means and the detector means for controlling the levels of slurry in the compartments constant.

The feed means feed slurries of different compositions to the compartments. As the base film travels, the slurries are applied in the form of at least two parallel strips to the base film, with the slurry strips being automatically joined along their adjacent longitudinal edges.

Also provided is a multi-layer ceramic electric or electronic part prepared by stacking a plurality of green ceramic sheets and firing the stacked layers, at least one of the green ceramic sheet being prepared by means of the doctor blade apparatus defined above.

BENEFITS OF THE INVENTION

The ceramic heater element of the present invention is most often a heater element intended for rapid temperature rise. A predominant portion or the entirety of the ceramic heater element is prepared simply by placing ceramic green sheets one on top of the other and cutting the stack into a strip shape, followed by firing. Since a plurality of elements can be integrally and concurrently prepared until the firing step, the process is efficient. The subsequent steps are simply to cut the green stacked structure into strips and to fire them. The overall process is efficient and cost effective.

The rapid temperature rise heater element disclosed in JP-B 61832/1992 has a U shape containing a notched space inside and thus provides insufficient strength, which requires the two perpendicular legs to have a substantial thickness, resulting in a large size as a whole. This element is less durable. In contrast, the ceramic heater element intended for rapid temperature rise according to the present invention uses a sintered insulating ceramic layer and an exothermic section and leads integrated therewith. The exothermic section is formed integral with the end and side surfaces of the distal portion of the sintered insulating ceramic layer. The entire structure is generally configured as an integral plate. Then the element provides strength and allows for size reduction. The size reduction leads to the great advantages that the element requires less energy for a temperature rise, is resistant against thermal impact and durable against repetitive rapid temperature rise over time.

The sintered insulating ceramic layer, exothermic section and leads are constructed from compositions predominantly comprising identical components including an oxide and a silicide and/or carbide, but in a different mix proportion. Then the overall layer structure is fully durable in that it does not experience crack occurrence and resistance deterioration upon repetitive rapid temperature rise over time. If a nitride is contained, the element would exhibit NTC characteristics and be impractical unless it is sintered in nitrogen. Without using nitride, the invention removes such a restrain from sintering conditions and ensures consistent manufacture of elements having improved PTC characteristics and hence, improved temperature rise characteristics.

It is to be noted that JP-A 202470/1989 discloses a ceramic heater in the form of a sintered body comprising an insulating layer and a conductive layer integrally formed above and below and at one end of the insulating layer, with leads attached to the sintered body. No lead layers are formed integral with the sintered body. Since the element as a whole is a heater and subject to temperature rise, the lead connections must withstand high temperature. It is quite difficult and impractical to maintain the bond strength of the lead connections even when the element generates heat to high temperature. It might be possible to secure contact by mechanical pressure such as by springs. Nevertheless, few materials withstand high temperature and if any, it will not last long. Another possible means is to secure the connections with cement. None of these means is successful in avoiding temperature rise of the lead connections.

In the ceramic heater element of the invention wherein a molybdenum silicide-aluminum oxide mix material is used to construct the exothermic section, by adding a suitable amount of metal carbide to the mix material, it becomes possible to impart a semiconductor-like electric resistance-temperature curve to thereby control a temperature coefficient of resistance positive. In this regard, it is desirable that the additive itself does not show a semiconductor behavior, but cooperates with the exothermic section composition to exhibit a semiconductor behavior. The metal carbide used is at least one of ZrC, WC, TaC, TiC, NbC, HfC and MoC, which allows for firing without a hot press.

Since it is possible to effect machining on elements at the stage of green chips prior to firing, the machining is quite easy, leading to a cost reduction. This is advantageous particularly when a slit is machined as a means for relieving stresses for increasing the capacity of the heater element as will be described later in detail.

The silicide conductor has the advantage that a silicon oxide protective film forms on the surface thereof by self heating. This eliminates a conventional step of placing a sintered body into a furnace of an oxidizing atmosphere for heat treatment. A silicon oxide protective film is formed in a simple manner and at a low cost.

In the prior art, a silicon oxide protective film is formed over the entire surface of a sintered body. To complete a heater element by applying terminal electrodes, unnecessary portions of the silicon oxide protective film must be removed. According to the present invention, formation of a silicon oxide protective film is effected after an element structure is completed, eliminating the step of removing the silicon oxide protective film. This also allows for simple, low cost manufacture of ceramic heater elements.

Where the heater element uses molybdenum silicide as a major component thereof, at least one first component selected from the group consisting of Mo which is one constitutional element of molybdenum silicide, Si, and W having similar properties to Mo is combined with at least one second component selected from the group consisting of Fe, Co, and Ni having excellent plating adherence to provide an electrode-forming material which can be applied to the element or molybdenum disilicide body by paste baking techniques, forming terminal electrodes bonded to the element with a high bond strength. Since the resulting terminal electrodes experience little change of resistance with time, the ceramic heater element provides stable performance.

In the preferred ceramic heater element of the invention, the exothermic section is provided with a means for relieving stresses in the exemplary form of a slit or small apertures to substantially divide the exothermic section into two or more zones whereby stress induction is suppressed to prevent cracking and failure of the entire exothermic section.

Although JP-A 80786/1986 and 104581/1986 disclose heater elements having slits formed in the exothermic section, these slits are provided mainly for the purpose of improving uniform heat generation throughout the heater element, but not for the stress relief purpose as in the present invention. The heater elements disclosed in JP-A 80786/1986 and 104581/1986 include the exothermic section which is a resistor of a single material, but not an integrally shaped and sintered structure of insulating and resistance layers as used in the present invention. A slit formed in such a resistor body will act and function in a different way from the slit used in the present invention.

According to the present invention, in manufacturing a ceramic heater element, a ceramic green sheet including regions of different compositions or materials is formed as an interconnection of wet regions with adjacent longitudinal sides closely adjoined to each other. During subsequent firing, these regions are closely and firmly joined along the boundary without special means like thermo-compression bonding. This is because materials of the respective regions intermix at the boundary or joint. High bond strength at the joint restrains separation or crack occurrence at the joint upon thermal cycling after firing.

DESCRIPTION OF THE PREFERRED EMBODIMENTS

First form

Figure 1:
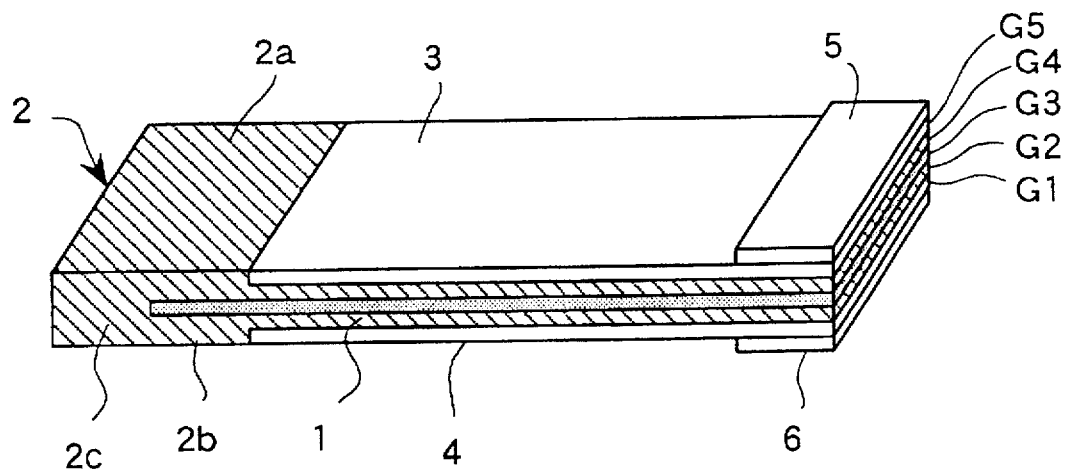
FIGS. 1, 2 and 3 are perspective views of exemplary rapid temperature rise heater elements according to different embodiments of the present invention.
Figure 2:
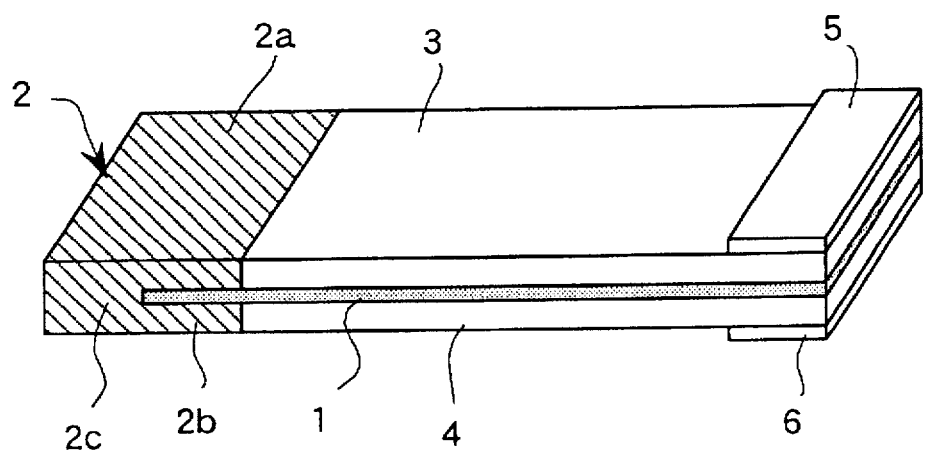
Figure 3:
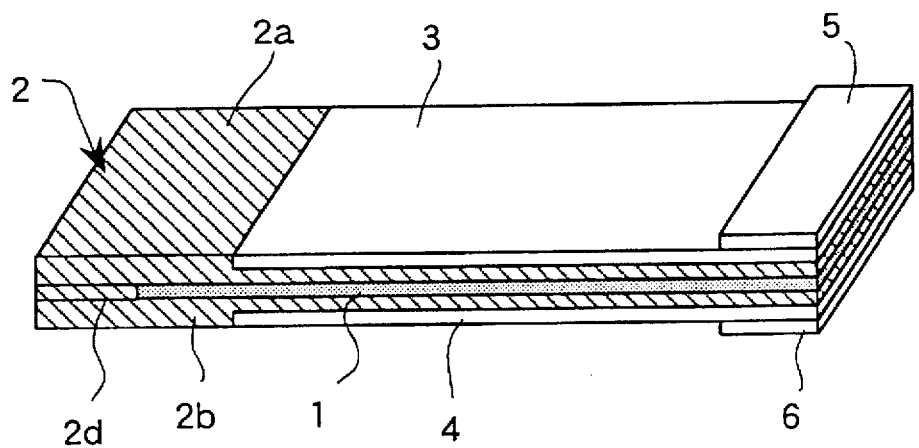

Referring to FIGS. 1, 2, and 3, there are illustrated rapid temperature rise heater elements in the form of ceramic heater elements according to three preferred embodiments of the present invention.

The rapid temperature rise heater element according to the invention is preferably configured as a generally rectangular plate and includes a sintered electrically insulating ceramic layer 1, an exothermic section 2, and first and second lead layers 3 and 4. The overall configuration of the element is preferably a plate as mentioned above although it may take another form like a cylinder. The exothermic section 2 includes first and second sintered high-resistance, conductive ceramic layers 2a and 2b which are formed on the entire area (FIG. 1) or selected areas (FIG. 2) of the upper and rear surfaces of the sintered insulating ceramic layer 1 from a relatively high resistance, conductive ceramic material into a planar or curvilinear plate form. The exothermic section 2 further includes a connecting portion 2c which is formed integrally with the first and second sintered high-resistance, conductive ceramic layers 2a and 2b from a relatively high resistance, conductive ceramic material such as to form an electric current path which extends from one to the other of the first and second sintered high-resistance, conductive ceramic layers 2a and 2b around a portion of the periphery of the sintered insulating ceramic layer 1, the distal edge of the sintered insulating ceramic layer 1 in the illustrated embodiments. The distal edge is the left edge in FIGS. 1 to 3.

The first and second lead layers 3 and 4 are formed contiguous to the first and second sintered high-resistance, conductive ceramic layers 2a and 2b. In the embodiments of FIGS. 1 and 3, steps are provided in the first and second sintered high-resistance, conductive ceramic layers 2a and 2b and the first and second lead layers 3 and 4 are formed on those rear reduced thickness portions of the first and second sintered high-resistance, conductive ceramic layers 2a and 2b which extend rearward from the steps to the rear ends. Preferably the opposed surfaces of the first and second lead layers 3 and 4 are flush with the opposed surfaces of the first and second sintered high-resistance, conductive ceramic layers 2a and 2b, respectively. In the embodiment of FIG. 2 wherein the first and second sintered high-resistance, conductive ceramic layers 2a and 2b are limited to the selected areas of the sintered insulating ceramic layer 1, the first and second lead layers 3 and 4 are formed on the rear portion of the sintered insulating ceramic layer 1 such that they form surfaces flush with the opposed surfaces of the first and second sintered high-resistance, conductive ceramic layers 2a and 2b.

In the above-mentioned construction, the rapid temperature rise heater element of the invention is preferably configured as a generally rectangular plate as illustrated in the figures and has the exothermic section 2 formed at the longitudinally distal end of the plate. The "exothermic section" used herein is not limited to a resistance layer, but may also include a portion of the sintered insulating ceramic layer 1 along with the resistance layer. More specifically, the exothermic section is a section which serves to develop heat in a substantial sense and designates the distal portion of the element which extends to the distal side from the (distal) edges of the lead layers 3 and 4.

On the first and second lead layers 3 and 4 are formed electrode layers or terminal electrodes 5 and 6 of a metal for external connection. The electrode layers 5 and 6 may be disposed at any position on the first and second lead layers 3 and 4. Desirably, the electrode layers 5 and 6 are disposed at or near the other end of the rapid temperature rise heater element which is opposite to the one end where the exothermic section 2 is formed, avoiding the electrode layers 5 and 6 from being heated to high temperature.

If the connection portion 2c of the exothermic section 2 is of an increased size, there can be a situation where only the first and second sintered high-resistance, conductive ceramic layers 2a and 2b develop heat, depending on the relative areas of the components. In this situation, a sandwich structure having centrally interleaved a layer 2d having a higher resistance may be provided as shown in FIG. 3 so that the connecting portion 2c will fully develop heat.

Desirably, the rapid temperature rise heater element of the invention is covered on its outer surface with a protective film which is chemically and thermally stable, heat resistant, and oxidation resistant though not shown.

The rapid temperature rise heater element of the invention has a temperature rise time from room temperature to 1000° to 1500° C. set within 10 seconds, preferably 1 to 5 seconds. Also the heater element generally has an element resistance set in the range of 0.5 to 20 kΩ although it varies with the ranges of applied power and voltage. The exothermic section has an electrical resistance which is higher than the resistance of the first and second lead layers by a factor of about 10 or more, especially by a factor of about 20 to about 1,000. This difference ensures that the terminal electrodes are not heated to an extremely high temperature. Since the resistance value mentioned above will increase by a factor of about 4 due to PTC characteristics when the element develops heat to increase the temperature from room temperature to 1,000° C., one approach is to set the resistance value at room temperature reduced to about a quarter of the target value.

Desirably, the rapid temperature rise heater element of the invention is dimensioned so as to have a thickness in the range of about 100 to 2,000 μm, a width in the range of about 200 to 5,000 μm, preferably about 800 to 3,000 μm, and a length in the range of about 15 to 70 mm, preferably about 25 to 50 mm. With a thickness below the range, mechanical strength would be low. A thickness beyond the range would lead to a too greater thermal capacity, a slower temperature rise and a lower thermal impact resistance which will cause crack occurrence upon rapid temperature rise. A width below the range would lead to low mechanical strength, handling difficulty, and a less thermal capacity. As the conductor is subject to more oxidation during long-term operation, the proportion of an oxidized stratum increases so that the element is greatly affected by oxidation. A width beyond the range would lead to a too greater thermal capacity and a lower temperature rise. Even after the heat radiating area is increased, the temperature rise would be slow. Thermal impact resistance would become low which will cause crack occurrence upon rapid temperature rise. With a length below the range, it would be difficult to space the terminal electrodes fully apart from the exothermic section, with a possibility of the terminal electrodes being subject to high temperature. A length beyond the range would lead to low mechanical impact resistance and handling difficulty.

Desirably, the sintered insulating ceramic layer 1 and the first and second sintered high-resistance, conductive ceramic layers 2a and 2b each have a thickness of about 1 to 1,000 μm, more desirably about 10 to 500 μm. A thickness of less than 1 μm would lead to insufficient mechanical strength, occurrence of through-holes, and electrical short-circuits. A thickness of more than 1,000 μm would lead to a greater thermal capacity, a slower temperature rise and a possible failure of the element by thermal impact upon rapid temperature rise.

Desirably the exothermic section as a whole has a thickness of about 100 to 2,000 μm, more desirably about 500 to 1,000 μm. A thickness of less than 100 μm would lead to insufficient mechanical strength to use in practice. Upon long-term operation, the exothermic section would react with an oxidized layer which will be formed in the conductor, resulting in deterioration of insulation. A thickness of more than 2,000 μm would lead to a greater thermal capacity, a time-consuming temperature rise, and low thermal impact resistance. Moreover, from the standpoint of exothermic characteristics, the connecting portion 2c of the exothermic section should desirably extend about 200 to 2,000 μm forward of the distal end of the sintered insulating ceramic layer 1. And the first and second sintered high-resistance, conductive ceramic layers 2a and 2b should desirably be present on the sintered insulating ceramic layer 1, over a length between 100 μm at minimum, especially 500 μm at minimum and the length of the sintered insulating ceramic layer 1 at maximum. Within such a length, the exothermic section would have an equally heated region enlarged and the occurrence of cracks upon repetitive temperature rises would be minimized, which provides improvements in thermal impact resistance and durability.

In order to provide a more satisfactory rapid temperature rise, the exothermic section should preferably occupy 1 to 60%, more preferably 5 to 40% by volume of the entire volume of the element.

The first and second lead layers 3 and 4 would have a thickness of about 1 to 1,000 μm.

The sintered insulating ceramic layer 1 is formed of a ceramic composition composed mainly of a first insulating component in the form of a metal oxide and a second conductive component in the form of a metal silicide and/or a metal carbide. It is acceptable to use only the first insulating component although the addition of the second conductive component thereto is preferred for durability improvement.

Preferably the metal oxide is at least one member in powder form selected from the group consisting of aluminum oxide, zirconium oxide, chromium oxide, titanium oxide, tantalum oxide, silicon oxide, magnesium aluminum oxide and silicon aluminum oxide (for example, mulite $3Al_2O_3 \cdot 2SiO_2$ and sillimanite $Al_2O_3 \cdot SiO_2$).

Also preferably, the metal silicide is at least one member in powder form selected from the group consisting of molybdenum silicide, tungsten silicide, and chromium silicide; and the metal carbide is at least one member in powder form selected from the group consisting of silicon carbide and titanium carbide. The preferred second component is a silicide, especially molybdenum silicide.

In the sintered insulating ceramic layer 1, the first insulating component and the second conductive component are desirably mixed in a volume ratio of from 10:0 to 8:2, more preferably from 10:0 to 9.3:0.7, especially from 9.8:0.2 to 9.3:0.7. If the content of the second conductive component exceeds 20% by volume, the material would be more or less conductive since the insulation by the first insulating material is impaired.

Like the sintered insulating ceramic layer 1, the exothermic section 2 is formed of a ceramic composition composed mainly of a first insulating component in the form of a metal oxide and a second conductive component in the form of a metal silicide and/or a metal carbide. The metal oxide, metal silicide and metal carbide may be selected from the same examples as mentioned above.

The compositional ratio of the first insulating component to the second conductive component in the exothermic section, which is largely affected by the particle size distribution, is desirably set to give a volume ratio of from 7.5:2.5 to 5.5:4.5, more preferably from 7:3 to 6:4 provided that these powders have a mean particle size of about 0.2 to 2 μm. If the content of the second conductive component is less than 25% by volume, the mix material would have a too high resistance. If the content of the second conductive component exceeds 45% by volume, the mix material would have a too low resistance to generate a proper amount of heat.

Where the exothermic section 2 has the structure shown in FIG. 3, the high resistance layer 2d portion contains the first insulating component in a higher ratio than the remaining portion so that the layer 2d has a higher resistance. The ratio of the first insulating component in the layer 2d is determined by the resistance values of the first and second sintered high resistance conductive ceramic layers 2a and 2b and the connecting portion 2c which are, in turn, calculated on the basis of their dimensions.

Like the sintered insulating-ceramic layer 1 and the exothermic section 2, the first and second lead layers 3 and 4 are formed of a ceramic composition composed mainly of a first insulating component in the form of a metal oxide and a second conductive component in the form of a metal silicide and/or a metal carbide. It is acceptable to use only the second conductive component although the addition of the first insulating component thereto is preferred from the standpoint of durability. The metal oxide, metal silicide and metal carbide may be selected from the same examples as mentioned above.

In the first and second lead layers, the first insulating component and the second conductive component are desirably mixed in a volume ratio of from 5:5 to 0:10, more preferably from 5:5 to 1:9. If the content of the second conductive component is less than 50% by volume, the resulting lead layers would have a high resistance causing considerable heat generation.

If desired, the first and second lead layers are layers of a metal or alloy applied by baking, thermal spraying, plating or sputtering, rather than the ceramic layers. The metals used herein include, for example, platinum and palladium, and examples of the alloy used herein include stainless steel, nickel-chromium-aluminum, and cobalt and yttrium system alloys such as Ni-Cr-Al-Y, Co-Cr-Al-Y, Ni-Co-Cr-Al-Y, and Ni-Cr.

The terminal electrodes are formed of palladium, silver, nickel, aluminum and solder, for example. Among these, electrodes of palladium, silver or nickel are formed by baking and electrodes of aluminum are formed by thermal spraying.

The protective film is formed of at least one member selected from the group consisting of silica, alumina, titania, chromia, and tin oxide. It has a thickness of about 0.1 to 100 μm, especially about 1 to 100 μm. The protective film may be formed by any of oxidation, dipping, sol-gel and coating techniques. Note that the dipping technique is to dip the heater element in a solution of the selected metal.

Preferably the sintered insulating ceramic layer, exothermic section, and first and second lead layers are sintered ceramic bodies formed of ceramic compositions predominantly comprising an identical first insulating component and an identical second conductive component, but different in blend ratio of the components. This reinforces the bond between layers and improves durability.

In this embodiment, the respective layers may contain up to 2% by weight of silicon carbide. Also an alkaline earth metal oxide, yttrium oxide or rare earth metal oxide or a compound capable of converting into such an oxide upon firing (for example, carbonates, oxalates and hydroxides) may be contained as a sintering aid. More particularly, one or more oxides of Ca, Ba, Mg, Y, La, Ce, Sm, Dy, and Nd may be contained in an amount of up to 10% by weight, especially 0.1 to 10% by weight. Preferably both the first insulating component and second conductive component have a particle size of about 1 to 50 μm.

The rapid temperature rise heater element of the invention is fabricated by the following method.

At the start of fabrication, source materials for forming the sintered insulating ceramic layer, exothermic section and lead layers are first prepared. This preparation is carried out by weighing the first insulating component and second conductive component both in powder form in accordance with the blend ratios for the respective layers, and blending them while adding suitable amounts of a binder and solvent thereto.

Preferably the first and second component powders have a mean particle size of about 0.1 to 3 μm and about 0.5 to 8 μm, respectively. An acrylic binder is the preferred binder. Toluene is typically used as the solvent.

The thus prepared blends are mixed in ball mills, for example, into slurries. The mixing time is generally about 3 to 24 hours. The slurries are applied by a conventional doctor blade or extrusion technique to form three types of green sheets for the sintered insulating ceramic layer, exothermic section, and lead layers. The green sheets have a thickness which is previously determined by calculation such that the layers as fired may have a thickness in the desired range.

The green sheets are then stacked so as to provide any of the cross-sectional structures shown in FIGS. 1 to 3. Layer build-up is preferably carried out by thermo-compression bonding under a pressure of about 50 to 2,000 kg/cm$^2$ and a temperature of about 50° to 150° C. Layer build-up can be done without forming sheets, that is, by repeatedly applying the respective slurries by a screen printing technique.

Thereafter, the layered structure is cut into strips conforming to the final heater element configuration. This step requires cutting along the four sides of a rectangular strip at the maximum.

After cutting, discrete elements are subject to binder removal and firing. The binder removal is desirably carried out under the following conditions, for example.

Heating rate: 6°–300° C./hour, especially 30°–120° C./hour

Holding temperature: 250°–380° C., especially 300°–350° C.

Holding time: 1–24 hours, especially 5–20 hours

Atmosphere: air, nitrogen gas, argon gas or nitrogen gas steam mixture

The firing is desirably carried out under the following conditions, for example.

Heating rate: 300°–2000° C./hour, especially 500°–1000° C./hour

Holding temperature: 1400°–1700° C., especially 1500°–1650° C.

Holding time: ½–3 hours, especially 1–2 hours

Cooling rate: 300°–2000° C./hour, especially 500°–1000° C./hour

The firing atmosphere may be vacuum, argon gas, helium gas or hydrogen gas. It is desirable to avoid a nitrogen atmosphere because the exothermic section, if nitrided, will have a negative temperature characteristic. The binder removal and firing may be carried out either independently or continuously.

On the surface of the thus sintered body, a protective film is applied. This coating may be effected by dipping the sintered body in a dispersion of a coating material or a metal alkoxide solution or an alkoxide solution having a coating material dispersed therein. If the coating material is silica, a silicone resin is applied to the surface of the sintered body, followed by firing.

Finally, silver or suitable metal paste is applied and baked to the surface of the first and second lead layers at predetermined positions to form terminal electrodes, completing the manufacture of a rapid temperature rise heater element. Further, the terminal electrodes may be electrically connected to lead wires or fitted in a socket.

The thus fabricated rapid temperature rise heater element of the invention finds use as gas igniters and has a drive voltage of about 12 to 400 volts which is commensurate with automotive batteries.

Second form

In the second form of the invention, the ceramic heater element includes an exothermic section which is formed of a sintered ceramic composition containing a molybdenum silicide-aluminum oxide mix material as a major component and at least one additive selected from the group consisting of carbides of Zr, W, Ta, Ti, Nb, Hf, and Mo. The carbides used herein are generally in the form of ZrC, WC, TaC, TiC, NbC, HfC, and MoC.

The molybdenum silicide-aluminum oxide mix material should have a resistivity of $1 \times 10^{-2}$ to $5 \times 10^0$ $\Omega$cm as sintered. With a resistivity of less than $1 \times 10^{-2}$ $\Omega$cm, the material has a too low resistance to serve as a heater. With a resistivity of more than $5 \times 10^0$ $\Omega$cm, the material has a too high resistance so that a temperature of 1,200° C. may not be exceeded.

In the molybdenum silicide-aluminum oxide mix material used as a major component of the exothermic section, molybdenum silicide and aluminum oxide are desirably mixed in a volume ratio of from 40/60 to 15/85, especially from 35/65 to 20/80. A molybdenum silicide content of less than 15% by volume would lead to a higher resistance whereas a content of more than 40% by volume would lead to a too low resistance to develop an acceptable amount of heat. The molybdenum silicide and aluminum oxide are present as distinct phases in the mix and both have a mean grain size of about 0.2 to 30 μm.

The additive in the form of ZrC, WC, TaC, TiC, NbC, HfC, and MoC is preferably contained in a total amount of 0.01 to 10% by volume, more preferably 0.05 to 5% by volume, especially 0.1 to 3% by volume of the ceramic composition. Less than 0.01% by volume of the additive is less effective whereas more than 10% by volume of the additive would render it difficult to fully consolidate the composition when fired without using a hot press. The additive is generally present at the grain boundary or association site. In addition to the essential additive mentioned above, SiC may be further added to the ceramic composition in an amount of about 0.01 to 2% by volume.

A binder and solvent are added to the above-mentioned raw materials and mixed to prepare a slurry, which is applied by a doctor blade technique or the like to form a green sheet from which the exothermic section is to be formed. In this context, the slurry for the exothermic section is sometimes called a resistive slurry.

Figure 4:
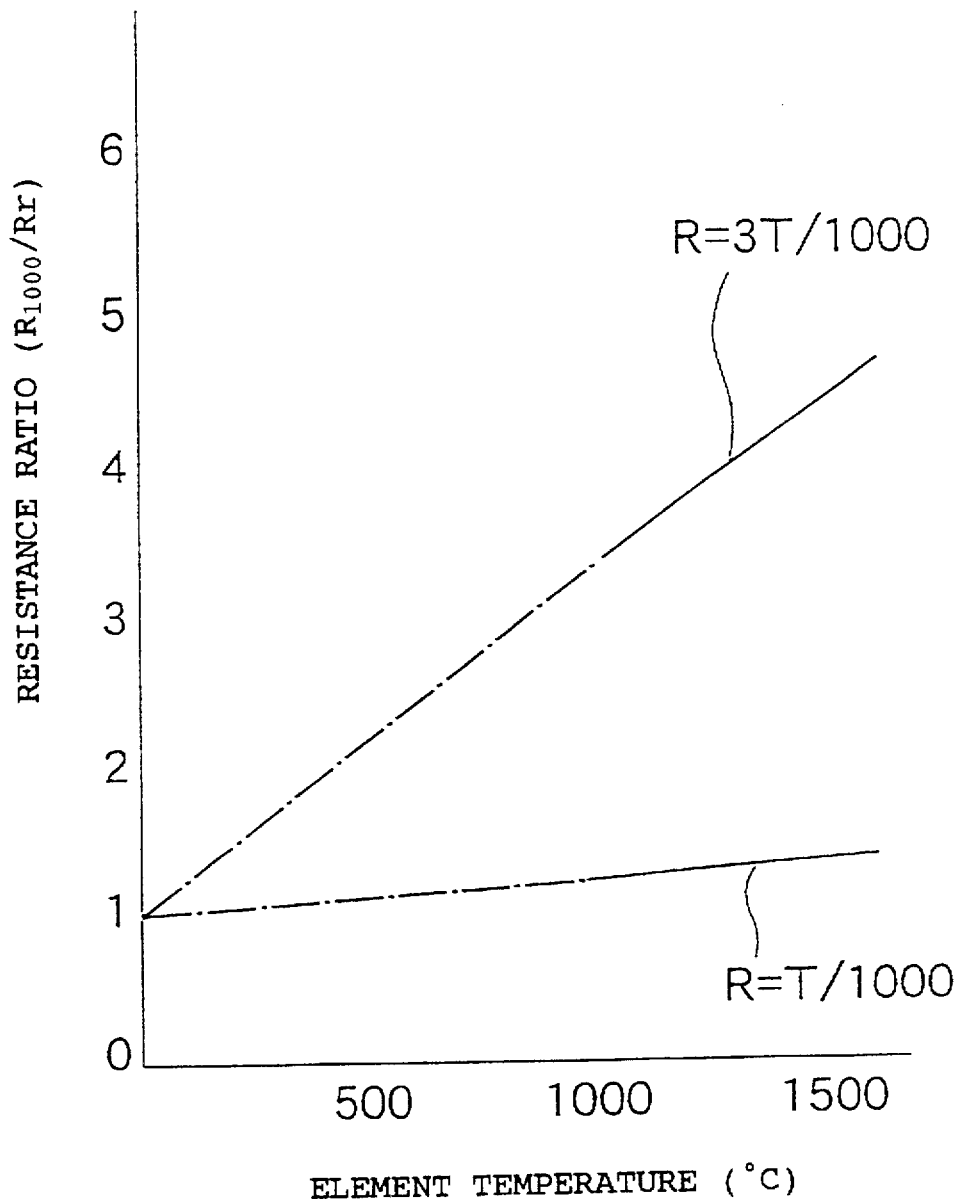
FIG. 4 is a diagram wherein resistance ratio R is plotted relative to element temperature T for illustrating a temperature coefficient of resistance.

When the ceramic heater element including an exothermic section based on a molybdenum silicide-aluminum oxide mix material is used as a rapid temperature rise heater element for use in gas ignition or the like, the exothermic section should preferably satisfy the following condition. Provided that the exothermic section has a temperature coefficient of resistance m and a ratio R of its resistivity at a temperature of at least 1,000° C. to its resistivity at room temperature (20° C.), and the heater element has a temperature T (°C.), R=mT/1000 should fall within the region defined and encompassed by the straight lines R=T/1000 and R=3T/1000 in a diagram as shown in FIG. 4 wherein the resistivity ratio R is plotted on the ordinate and the element temperature T is plotted on the abscissa. By setting the exothermic section's temperature coefficient of resistance m within the above-defined region, the heater element can be heated from room temperature to 1,000° C. within 5 seconds, but not overheated to above 1,600° C. If the exothermic section's temperature coefficient of resistance m deviates from the above-defined region in a lower direction, overheating above 1,600° C. can occur, and if the same deviates from the above-defined region in an upper direction, rapid heat development would be retarded.

In the ceramic heater element mentioned above, the exothermic section should preferably be supported by an insulating ceramic layer. More specifically, the ceramic heater element preferably has a structure as shown in FIG. 1.

In the ceramic heater element including an exothermic section of the above-mentioned ceramic composition, the sintered insulating ceramic layer 1 (FIG. 1) may be similar to that described in the first form. Desirably, the sintered insulating ceramic layer is formed of a ceramic composition composed mainly of aluminum oxide and molybdenum silicide. When the sintered insulating ceramic layer is formed of a ceramic composition composed of identical major components to those of the exothermic section, the joint between the sintered insulating ceramic layer and the exothermic section is improved.

A binder and solvent are added to the above-mentioned raw materials and mixed to prepare a slurry, which is applied by a doctor blade technique or the like to form a green sheet from which the sintered insulating ceramic layer is to be formed. In this context, the slurry for the sintered insulating ceramic layer is sometimes called an insulating slurry.

The first and second lead layers 3 and 4 (FIG. 1) may be the same as in the first form. Like the sintered insulating ceramic layer, the lead layers desirably use a ceramic composition composed mainly of aluminum oxide and molybdenum silicide. When the sintered insulating ceramic layer, exothermic section and lead layers are formed of ceramic compositions composed of identical major components, the joint of the lead layers to the sintered insulating ceramic layer and the exothermic section is improved.

A binder and solvent are added to the above-mentioned raw materials and mixed to prepare a slurry, which is applied by a doctor blade technique or the like to form a green sheet from which the lead layers are to be formed. In this context, the slurry for the lead layers is sometimes called a conductive slurry.

Desirably the ceramic heater element of the second form has the same dimensions as in the first form.

Also desirably, as in the first form, the ceramic heater element of the invention is covered on its outer surface with a protective film which is chemically and thermally stable, heat resistant, and oxidation resistant though not shown. The protective film is formed of the same material as in the first form, with silica being especially preferred. The protective film may be formed by any of oxidation, dipping, sol-gel and coating techniques, with the oxidation technique being preferred. It is most desirable to form silica on the surface of the heater element by conducting electricity through the element in an oxidizing atmosphere, for example, air, thereby causing the element to develop heat to a higher temperature than the normal operating state.

Such conventional ceramic heater elements, especially ceramic rapid temperature rise heater elements have the problem that if the size is increased for providing a greater thermal capacity, the exothermic section be subject to cracking or failure by thermal expansion upon rapid temperature rise. This problem is aggravated by the use of molybdenum silicide having a higher coefficient of thermal expansion.

According to the invention, the structure is improved for mitigating the stresses induced by thermal expansion for preventing cracking and failure. More particularly, the exothermic section is provided with a space for relieving stresses in the exemplary form of a slit or small apertures to substantially divide the exothermic section into two or more zones whereby stress induction is suppressed to prevent cracking and failure of the entire exothermic section. This constitutes the fifth form of the invention, which is the same as the first and second forms except for the stress relieving space or slit as will be described later.

The ceramic heater element of the second form is fabricated as follows. The following description refers to the fabrication of a ceramic heater element of the structure shown in FIG. 1 although the invention is not limited thereto.

At the start of fabrication, source materials for forming the sintered insulating ceramic layer, exothermic section and lead layers are first prepared. This preparation is carried out by weighing the first insulating component (inclusive of aluminum oxide as a major component in the exothermic section) and the second conductive component (inclusive of molybdenum disilicide as another major component in the exothermic section) both in powder form in accordance with the blend ratios for the respective layers, and blending them while adding the additive or metal carbide thereto as well as a binder and solvent.

The thus prepared blends are mixed in ball mills, for example, into insulating, resistive and conductive slurries. The mixing time is generally about 3 to 24 hours. Using these slurries, three types of green sheets are formed for the sintered insulating ceramic layer, exothermic section, and lead layers.

The green sheets are then stacked so as to provide the cross-sectional structure shown in FIG. 1. Layer build-up is preferably carried out by thermo-compression bonding under a pressure of about 50 to 2,000 kg/cm$^2$ and a temperature of about 50° to 150° C.

Thereafter, the layered structure is cut into strips conforming to the final heater element configuration. This step requires cutting along the four sides of a rectangular strip at the maximum.

After cutting, discrete elements are subject to binder removal and firing. The binder removal is desirably carried out under the following conditions, for example.

Heating rate: 6–300° C./hour, especially 30°–120° C.hour

Holding temperature: 900°–1100° C., especially 950°–1050° C.

Holding time: 1–24 hours, especially 5–20 hours

Atmosphere: air, nitrogen gas, argon gas or nitrogen gas-hydrogen-steam mixture

The firing is desirably carried out under the following conditions, for example.

Heating rate: 300°–2000° C./hour, especially 500°–1000° C./hour

Holding temperature: 1400°–1850° C., especially 1700°–1800° C.

Holding time: ½–3 hours, especially 1–2 hours

Cooling rate: 300°–2000° C./hour, especially 500°–1000° C./hour

The firing atmosphere may be vacuum, argon gas, helium gas or hydrogen gas.

Finally, silver or suitable metal is baked to the surface of the first and second lead layers at predetermined positions to form terminal electrodes, completing the manufacture of a rapid temperature rise heater element. Further, the terminal electrodes may be electrically connected to lead wires or fitted in a socket.

On the surface of the sintered body of the heater element, a protective film is formed. The protective film is formed by conducting electricity through the element in an oxidizing atmosphere, thereby causing the element to develop heat to a higher temperature. Preferably the temperature at which the protective film is formed is higher than the temperature encountered during normal operation. If the temperature encountered during normal operation is 1,300° C., for example, the protective film-forming temperature should be higher than that temperature, especially above 1,400° C. It is then desirable that the amount of the metal carbide added to the exothermic section-forming composition is determined by taking into account the protective film-forming temperature.

Alternatively, a protective film may be formed on the surface of the sintered body by dipping the sintered body in a dispersion of a coating material or a metal alkoxide solution or an alkoxide solution having a coating material dispersed therein. If the coating material is silica, a silicone resin is applied to the surface of the sintered body, followed by firing. Where the protective film is formed by immersion in such a dispersion, the terminal electrodes should be formed subsequent to formation of the protective film.

The thus fabricated rapid temperature rise heater element of the invention finds use as gas igniters and has a drive voltage of about 12 to 400 volts which is commensurate with automotive batteries.

Third form

In the third form, the ceramic heater element uses a conductor containing a silicide as a conductive substance and has a dense silicon oxide protective film formed on the surface of the element.

The conductor contains a metal silicide which is preferably at least one member selected from the group consisting of suicides of molybdenum, tungsten, and chromium. The conductor may further contain another conductive substance in the form of a metal carbide. The metal carbide used herein is at least one member selected from the group consisting of carbides of silicon and titanium. The metal sulicide should be present in an amount of at least 0.1% by volume of the conductor material.

Preferably an insulating substance in the form of a metal oxide is contained in the conductor material for controlling the resistance value thereof. The metal oxide used herein is preferably at least one powder member selected from the group consisting of aluminum oxide, zirconium oxide, chromium oxide, titanium oxide, tantalum oxide, magnesium aluminum oxide, and mulite.

The insulating substance is sometimes referred to as a first insulating component and the conductive substance is sometimes referred to as a second conductive component.

Where the conductor material is used as the exothermic section of the ceramic heater element, it should preferably be formulated such that the compositional ratio of the second conductive component to the first insulating component may range from 40/60 to 15/85, especially from 35/65 to 20/80 by volume. If the volume of the conductive component is larger, the conductor material would have a too low resistivity to provide a difference in resistance from the leads, failing to ensure concentrated heat development within the exothermic section. if the volume of the conductive component is smaller, the conductor material would have a very high resistivity approximate to that of an insulator and inhibit conduction of substantial current, failing to provide the function of a heater element.

Silicon carbide (SiC) may be added to the conductor material for the purpose of reducing a positive temperature coefficient of resistance in a high temperature region. The amount of SiC added is up to 10% by volume of the conductor material. Conductor material with more than 10% by volume of SiC is less susceptible to sintering, not fully consolidated, and less reliable as a heater element. If added, SiC should be present in an amount of more than 0.01% by volume.

According to the third form of the invention, a dense silicon oxide protective film is formed on the surface of a conductor material by conducting electricity through the conductor material in an oxidizing atmosphere for a suitable time such that the conductor material itself may be heated to a high temperature of at least 1,000° C. Then $SiO_2$ forms on the conductor surface and constitutes at 1,000° C. or higher a sufficiently dense film to prevent further diffusion of oxygen.

If the heater element contains molybdenum disilicide $MoSi_2$, for example, during the electric conduction heating process, $MoSi_2$ in the vicinity of the element surface reacts with $O_2$ to form a dense silicon oxide protective film according to the following scheme.

$$5MoSi_2 + 7O_2 \rightarrow Mo_5Si_3 + 7SiO_2$$

The dense silicon oxide protective film is desired to be free of needle crystals of silicon oxide.

Preferably the silicon oxide protective film has a thickness of about 0.01 to 20 μm, especially about 0.1 to 2 μm. A film of less than 0.1 μm thick is susceptible to damages or flaws and does not fully serve for the protective function. A protective film of more than 20 μm thick has a coefficient of thermal expansion a which is small-as compared with the resistance layer having a coefficient of thermal expansion $\alpha = 8 \times 10^{-6}$ deg. so that the film is likely to peel off upon thermal cycling.

The oxidizing atmosphere referred to above is an atmosphere containing more than 5% of oxygen. Higher oxygen concentrations are desirable. Most preferably, heat treatment is carried out in 100% oxygen or an atmosphere of steam-containing air.

In order for the silicon oxide protective film to form, the conductor should reach a temperature of at least 1,000° C. during electric conduction. No dense silicon oxide protective film forms at temperatures below 1,000° C. The upper limit temperature reached by electric conduction heating is not critical although it is generally about 1,800° C. from the standpoint of a heater element. The temperature reached by electric conduction heating is desirably higher than the temperature the heater element encounters during normal operation, that is, the temperature to which the conductor will heat up during use. The reason will be described later.

During the electric conduction, the conductor is preferably maintained in a non-oxidizing atmosphere while the conductor is at a temperature below 1,000° C., especially in the range of 400° to 800° C. If an oxidizing atmosphere prevails in this temperature range, there can be formed acicular crystals of silicon oxide, which remain even after the conductor is heated to above 1,000° C. Then the protective film becomes porous, allowing the element to be oxidized during operation, esulting in a variation of the resistance value thereof. The referred non-oxidizing atmosphere-is an argon gas atmosphere.

The electric conduction time is desirably about 1 to 5 hours. A shorter time would not allow for development of a dense oxide film whereas a longer time would provide no further advantages and lead to a higher cost. The heating rate is about 1 minute from room temperature to 1,000° C. and cooling is non-forced cooling.

Preferably the heating conditions mentioned above are achieved by applying a voltage which is 5 to 50% higher than the normal operating voltage.

In the ceramic heater element of the third form, the exothermic section should preferably be supported by an insulating ceramic layer. More specifically, the ceramic heater element preferably has a structure as shown in FIG. 1. In this structure, the exothermic section 2 of the ceramic heater element is desirably formed of a conductor of the abovedefined composition. The sintered insulating ceramic layer 1 may be formed of a composition as previously mentioned in the first form, preferably a ceramic composition composed mainly of aluminum oxide and molybdenum silicide. When the sintered insulating ceramic layer is formed of a ceramic composition composed of identical major components to those of the exothermic section, the joint between the sintered insulating ceramic layer and the exothermic section is improved.

The first and second lead layers 3 and 4 (FIG. 1) may be the same as in the first form. Like the sintered insulating ceramic layer, the lead layers desirably use a ceramic composition composed mainly of aluminum oxide and molybdenum silicide. When the sintered insulating ceramic layer, exothermic section and lead layers-are formed of ceramic compositions composed of identical major components, the joint of the lead layers to the sintered insulating ceramic layer and the exothermic section is improved. In addition, a silicon oxide protective film is also formed on selected areas of the lead layers.

Desirably the ceramic heater element of the third form has the same dimensions as in the first form.

Such conventional ceramic heater elements, especially ceramic rapid temperature rise heater elements have the problem that if the size is increased for providing a greater thermal capacity, the exothermic section be subject to cracking or failure by thermal expansion upon rapid temperature rise. This problem is aggravated by the use of molybdenum silicide having a higher coefficient of thermal expansion.

Figure 5:
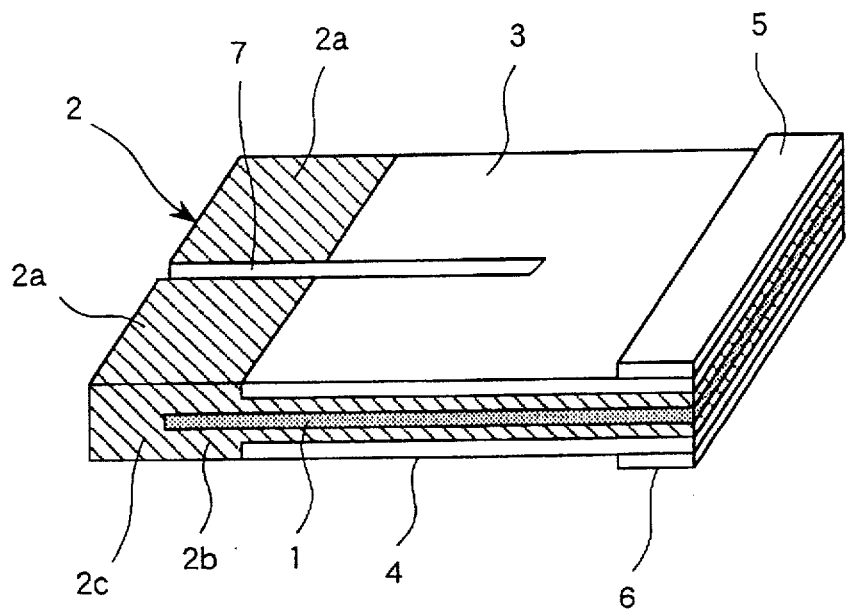
FIG. 5 is a perspective view of an exemplary rapid temperature rise heater element having a stress relieving slit according to a fifth form of the present invention.
Figure 6:
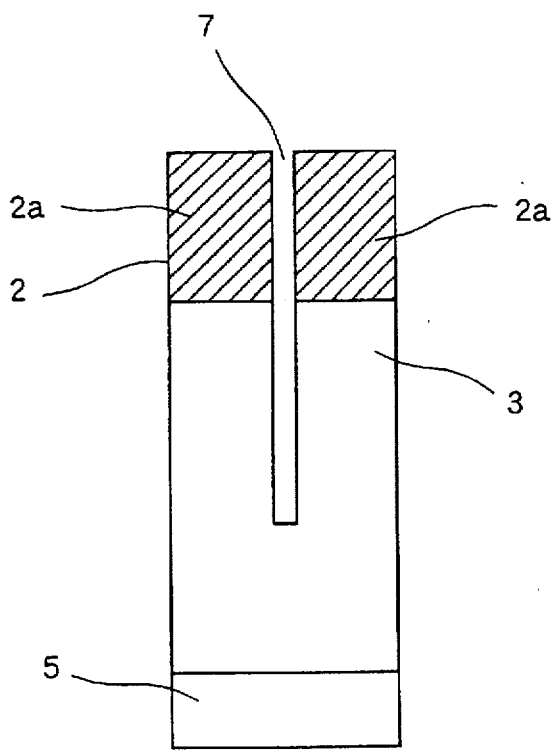
FIG. 6 is a plan view of the slit heater element of FIG. 5.

According to the invention, the structure is improved for mitigating the stresses induced by thermal expansion for preventing cracking and failure. More particularly, the exothermic section is provided with a space for relieving stresses in the exemplary form of a slit or small apertures to substantially divide the exothermic section into two or more zones whereby stress induction is suppressed to prevent cracking and failure of the entire exothermic section. This constitutes the fifth form of the invention, which is the same as the first and second forms except for the stress relieving space or slit as will be described later. The stress relieving space is illustrated in FIG. 5 as a single slit which extends longitudinally through the element structure from the distal (left) end to an intermediate point.

The stress relieving space in the ceramic heater element may have any desired shape as long as it can mitigate stresses induced in the exothermic section without causing a substantial change in the resistance value thereof. Then the space may be either a slit as mentioned above or a plurality of small apertures uniformly distributed over the entire area of the exothermic section. By providing the rapid temperature rise heater element with a stress relieving space or slit, the element is freed from cracking or crazing during operation even when it is of relatively large size.

In the ceramic heater element of the above-mentioned structure, a silicon oxide protective film can be formed on the exothermic section by applying a voltage across the terminal electrodes to cause the exothermic section to develop heat. If the first and second lead layers contain a metal silicide, electric conduction is preferably controlled such that a silicon oxide protective film is also formed on those portions of the lead layers which extend from the exothermic section over a certain length. In general, silicon oxide forms at temperatures above 400° C. Then the element is heated such that those portions of the lead layers which will reach temperatures above 400° C. during normal operation may reach a temperature above 1,000° C. whereupon a dense silicon oxide protective film is formed on those portions for preventing those portions from being oxidized during subsequent operation. The remaining portions of the lead layers, that is, those portions of the lead layers which are disposed adjacent to the terminal electrodes do not reach a temperature above 400° C. during normal operation of the heater element and are not oxidized. Then on the remaining portions of the lead layers, a silicon oxide film may be present or absent or acicular crystals of silicon oxide may be present.

The ceramic heater element of the third form can be fabricated by generally following the process of fabricating the ceramic heater element of the second form including an exothermic section composed mainly of a molybdenum silicide-aluminum oxide mix material from the source powder preparing step to the firing step.

After firing, silver or suitable metal is baked to the surface of the first and second lead layers at predetermined positions to form terminal electrodes, completing the manufacture of a ceramic rapid temperature rise heater element. Further, the terminal electrodes may be electrically connected to lead wires or fitted in a socket.

On the surface of the sintered body of the heater element, a protective film is formed. The protective film is formed by conducting electricity through the element in an oxidizing atmosphere, thereby causing the element to develop heat to a higher temperature. The conditions of electric conduction for self heating are as mentioned above.

The thus fabricated rapid temperature rise heater element of the invention also finds use as gas igniters and has a drive voltage of about 12 to 400 volts which is commensurate with automotive batteries.

Fourth form

In the fourth form of the invention, the ceramic heater element is a molybdenum silicide system material element comprising a main body of a material composed mainly of molybdenum silicide. The molybdenum silicide is typically molybdenum disilicide. The element further includes terminal electrodes of an electrode material containing at least one first component selected from the group consisting of Mo, W, and Si and at least one second component selected from the group consisting of Fe, Co, and Ni. Preferably the terminal electrodes have an electrical resistance of less than 10 mΩ.

In one preferred example, the electrode material contains at least molybdenum (Mo) in an amount of 70 to 100% by weight of the first component. The second component is contained in an amount of 30 to 90%, more preferably 50 to 80%, most preferably 60 to 70% by weight of the total weight of the electrode material.

In another preferred example, the electrode material contains at least tungsten (W) in an amount of 70 to 100% by weight of the first component. The second component is contained in an amount of 18 to 83%, more preferably 34 to 68%, most preferably 44 to 55% by weight of the total weight of the electrode material.

In a further preferred example, the electrode material contains at least silicon (Si) in an amount of 70 to 100% by weight of the first component. The second component is contained in an amount of 65 to 97%, more preferably 81 to 95%, most preferably 87 to 91% by weight of the total weight of the electrode material.

The content of the second component is limited as above because higher contents above the range would reduce the bond strength between the element and the electrodes whereas lower contents below the range would reduce the bond strength between the electrodes and solder.

Most preferably, molybdenum (Mo) and nickel (Ni) are used as the first and second components, respectively. In particular, nickel is contained in an amount of 70 to 100% by weight of the second component.

The terminal electrodes of the above-mentioned composition are formed on a molybdenum silicide system material element as follows. An electrode-forming paste is first prepared. The paste is prepared by weighing raw material powders in accordance with the desired compositional ratio, adding a binder and solvent to the powders, and fully mixing the ingredients. The binders used herein include methacrylic, ethyl cellulose, and polyvinyl alcohol binders. The solvents used herein include toluene, xylene, a-terpineol, methanol and ethanol. Mixing may be wet mixing using a ball mill or the like. The mixing time is about 5 to 48 hours though not critical.

The electrode-forming paste is then applied to predetermined positions of the element by screen printing techniques and then baked to complete formation of electrodes. Baking uses a neutral or reducing atmosphere. The neutral and reducing atmospheres include argon gas, helium gas, nitrogen gas, nitrogen gas-hydrogen gas mixtures, and vacuum. The baking temperature is preferably set in the range of 1,050° to 1,400° C. for a molybdenum base electrode material, 1,100° to 1,450° C. for a tungsten base electrode material, or 950° to 1,300° C. for a silicon base electrode material. If the baking temperature is below the range, the electrodes would bond to the element at low or little bond strength. If the baking temperature is above the range, a metal component of the electrode material would diffuse into the element, reducing the amount of metal retained in the electrode or promoting separation of the metal component to cause electrode stripping.

The molybdenum silicide system material element as one exemplary ceramic heater element according to the invention preferably has the structure shown in FIG. 1, for example.

The heater element is preferably configured as a generally rectangular plate and includes a sintered insulating ceramic layer 1, an exothermic section 2, and first and second lead layers 3 and 4. The exothermic section 2 includes first and second sintered high-resistance, conductive ceramic layers 2a and 2b which are formed on the entire area of the upper and rear surfaces of the sintered insulating ceramic layer 1 from a relatively high resistance, conductive ceramic material and a connecting portion 2c which is formed integrally with the first and second sintered high-resistance, conductive ceramic layers 2a and 2b from a relatively high resistance, conductive ceramic material such as to form an electric current path which extends from one to the other of the first and second sintered high-resistance, conductive ceramic layers 2a and 2b around the distal (left) edge of the sintered insulating ceramic layer 1. The first and second lead layers 3 and 4 are formed contiguous to the first and second sintered high-resistance, conductive ceramic layers 2a and 2b. In this construction, the heater element of the invention is preferably configured as a generally rectangular plate as illustrated in the figure and has the exothermic section 2 formed at the longitudinally distal end of the plate. The exothermic section includes a portion of the sintered insulating ceramic layer 1 along with the resistance layer.

The sintered insulating ceramic layer, exothermic section and first and second lead layers are formed of ceramic compositions composed mainly of a first insulating component in the form of a metal oxide and a second conductive component in the form of a metal silicide and/or a metal carbide. For the sintered insulating ceramic layer, it is acceptable to use only the first insulating component although the addition of the second conductive component thereto is preferred for durability improvement. For the first and second lead layers, it is acceptable to use only the second conductive component although the addition of the first insulating component thereto is preferred because the joint between the first and second sintered high-resistance, conductive ceramic layers and the first and second lead layers is improved. Among these, at least the first and second lead layers, preferably the first and second sintered high-resistance, conductive ceramic layers and the first and second lead layers should contain molybdenum silicide as the second conductive component according to the fourth form of the invention.

Preferably the metal oxide is at least one member in powder form selected from the group consisting of aluminum oxide, zirconium oxide, chromium oxide, titanium oxide, tantalum oxide, magnesium aluminum oxide, and mulite as previously mentioned.

In addition to molybdenum silicide, the metal silicide may include at least one member in powder form selected from the group consisting of tungsten silicide and chromium silicide. The metal carbide is at least one member in powder form selected from the group consisting of silicon carbide and titanium carbide as previously mentioned.

In the sintered insulating ceramic layer, the first insulating component and the second conductive component are desirably mixed in a volume ratio of from 10:0 to 8:2, more preferably from 10:0 to 9.3:0.7. If the content of the second conductive component exceeds 20% by volume, the material would be more or less conductive since the insulation by the first insulating material is impaired.

A binder and solvent are added to the above-mentioned raw materials and mixed to prepare a slurry, which is applied by a doctor blade technique or the like to form a green sheet from which the sintered insulating ceramic layer is to be formed. In this context, the slurry for the sintered insulating ceramic layer is sometimes called an insulating slurry.

In the first and second lead layers, the first insulating component and the second conductive component are desirably mixed in a volume ratio of from 5:5 to 0:10, more preferably from 5:5 to 1:9. If the content of the second conductive component is less than 50% by volume, the resulting lead layers would have a high resistance causing considerable heat generation. The lead layers should be constructed from a molybdenum silicide base material because terminal electrodes are formed thereon according to the fourth form of the invention.

A binder and solvent are added to the above-mentioned raw materials and mixed to prepare a slurry, which is applied by a doctor blade technique or the like to form a green sheet from which the lead layers are to be formed. In this context, the slurry for the lead layers is sometimes called a conductive slurry.

In the exothermic section, the first insulating component and the second conductive component are desirably mixed in a volume ratio of from 60:40 to 85:15, more preferably from 65:35 to 80:20. If the content of the first insulating component exceeds the range, the material would have a greater resistivity which requires an enlargement of cross-sectional area to provide a desired resistance value, which is less tolerant to thermal cycling. If the content of the first insulating component is below the range, the material would have a lower resistivity which requires a reduction of cross-sectional area to provide a desired resistance value, which leads to low mechanical strength.

A binder and solvent are added to the above-mentioned raw materials and mixed to prepare a slurry, which is applied by a doctor blade technique or the like to form a green sheet from which the exothermic section is to be formed. In this context, the slurry for the exothermic section is sometimes called a resistive slurry.

Desirably the ceramic heater element of the fourth form has the same dimensions as in the first form.

Also desirably, the ceramic heater element of the invention is covered on its outer surface with a protective film which is chemically and thermally stable, heat resistant, and oxidation resistant though not shown.

The protective film is formed of at least one member selected from the group consisting of silica, alumina, and chromia, with silica being especially preferred. It is about 0.1 to 100 μm thick. The protective film may be formed by any of oxidation, dipping, sol-gel and coating techniques as previously mentioned, with the oxidation technique being preferred. It is most desirable to form silica on the surface of the heater element by conducting electricity through the element in an oxidizing atmosphere, for example, air, thereby causing the element to develop heat to a higher temperature than the normal operating state, typically to a temperature of higher than 1,000° C.

Such conventional ceramic heater elements, especially ceramic rapid temperature rise heater elements have the problem that if the size is increased for providing a greater thermal capacity, the exothermic section be subject to cracking or rupture by thermal expansion upon rapid temperature rise. This problem is aggravated by the use of molybdenum silicide having a higher coefficient of thermal expansion.

According to the invention, the structure is improved for mitigating the stresses induced by thermal expansion for preventing cracking and rupture. More particularly, the exothermic section is provided with a space for relieving stresses in the exemplary form of a slit or small apertures to substantially divide the exothermic section into two or more zones whereby stress induction is suppressed to prevent cracking and failure of the entire exothermic section. This constitutes the fifth form of the invention as will be described later. The stress relieving space is illustrated in FIG. 5 as a single slit which extends longitudinally through the element structure from the distal (left) end to an intermediate point.

The stress relieving space in the ceramic heater element may have any desired shape as long as it can mitigate stresses induced in the exothermic section without causing a substantial change in the resistance value thereof. Then the space may be either a slit as mentioned above or a plurality of small apertures uniformly distributed over the entire area of the exothermic section. By providing the rapid temperature rise heater element with a stress relieving space or slit, the element is freed from cracking or crazing during operation even when it is of relatively large size.

The ceramic heater element of the fourth form is fabricated as follows. The following description refers to the fabrication of a ceramic heater element of the structure shown in FIG. 1 although the invention is not limited thereto.

At the start of fabrication, source materials for forming the sintered insulating ceramic layer, exothermic section and lead layers are first prepared. This preparation is carried out by weighing the first insulating component and second conductive component both in powder form in accordance with the blend ratios for the respective layers, and blending them while adding an optional additive in the form of a metal carbide thereto as well as a binder and solvent.

The thus prepared blends are mixed in ball mills, for example, into insulating, resistive and conductive slurries. The mixing time is generally about 3 to 24 hours. Using these slurries, three types of green sheets are formed for the sintered insulating ceramic layer, exothermic section, and lead layers. The green sheets have a thickness which is previously determined by calculation such that the layers as fired may have a thickness in the desired range.

The green sheets are then stacked so as to provide the cross-sectional structure shown in FIG. 1. Layer build-up is preferably carried out by thermo-compression bonding under a pressure of about 50 to 2,000 kg/cm$^2$ and a temperature of about 50° to 150° C.

Thereafter, the layered structure is cut into strips conforming to the final heater element configuration. This step requires cutting along the four sides of a rectangular strip at the maximum.

After cutting, discrete elements are subject to binder removal and firing. The binder removal is desirably carried out under the following conditions, for example, a heating rate of 6°–300° C./hour, especially 30°–120° C./hour, a holding temperature of 900°–1100° C., especially 950°–1050° C., a holding time of 1–24 hours, especially 5–20 hours, and an atmosphere of air, nitrogen gas, argon gas or nitrogen gas-hydrogen-steam mixture. The firing is desirably carried out under the following conditions, for example, a heating rate of 300°–2000° C./hour, especially 500°–1000° C./hour, a holding temperature of 1400°–1850° C., especially 1700°–1800° C., a holding time of ½–3 hours, especially 1–2 hours, and a cooling rate of 300°–2000° C./hour, especially 500°–1000° C./hour. The firing atmosphere may be vacuum, argon gas, helium gas or hydrogen gas. It is desirable to avoid a nitrogen atmosphere because the exothermic section will become insulating if nitrided to form silicon nitride. The binder removal and firing may be carried out either independently or continuously.

Finally, an electrode-forming paste as defined above is applied and baked to the surface of the first and second lead layers at predetermined positions to form terminal electrodes, completing the manufacture of a ceramic heater element. Further, the terminal electrodes may be electrically connected to lead wires or fitted in a socket.

On the surface of the sintered body of the heater element, a protective film is formed. The protective film is formed by conducting electricity through the element in an oxidizing atmosphere, thereby causing the element to develop heat to a higher temperature above 1,000° C. Preferably the temperature at which the protective film is formed is higher than the temperature encountered during normal operation. If the temperature encountered during normal operation is 1,300° C., for example, the protective film-forming temperature should be higher than that temperature, especially above 1,400° C.

Alternatively, a protective film may be formed on the surface of the sintered body by dipping the sintered body in a dispersion of a coating material or a metal alkoxide solution or an alkoxide solution having a coating material dispersed therein. If the coating material is silica, a silicone resin is applied to the surface of the sintered body, followed by firing. Where the protective film is formed by immersion in such a dispersion, the terminal electrodes should be formed subsequent to formation of the protective film.

The thus fabricated ceramic heater element of the invention also finds use as gas igniters and has a drive voltage of about 12 to 400 volts which is commensurate with automotive batteries.

Fifth form

The fifth form of the present invention is directed to a ceramic heater element which is provided with means for relieving stresses, typically a slit.

Preferred examples of the slit heater element are shown in FIGS. 5 to 8. The heater elements of FIGS. 5, 7, and 8 correspond to those of FIGS. 1, 2, and 3 except that a slit is formed as the stress relieving means. Like parts are designated by the same numerals.

Figure 7:
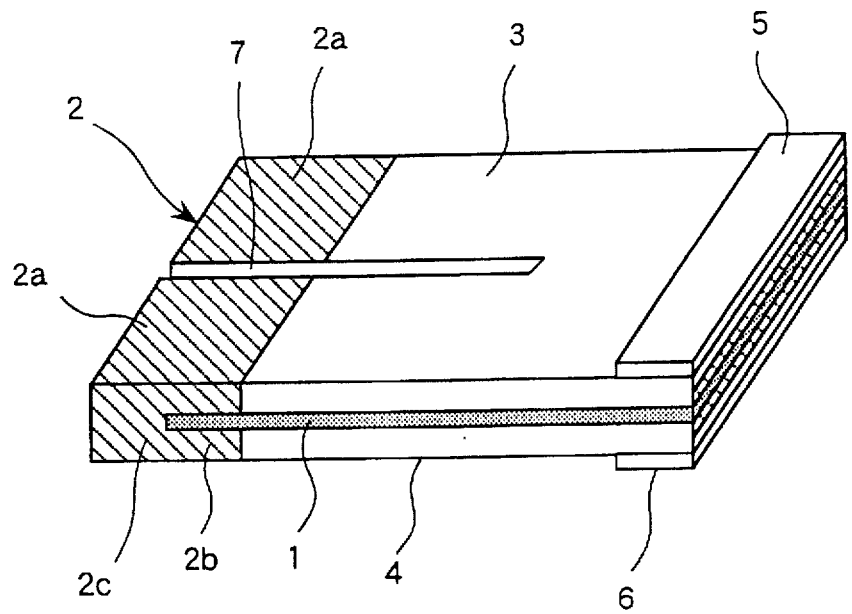
FIGS. 7 and 8 are perspective views similar to FIG. 5 showing other exemplary slit heater elements.
Figure 8:
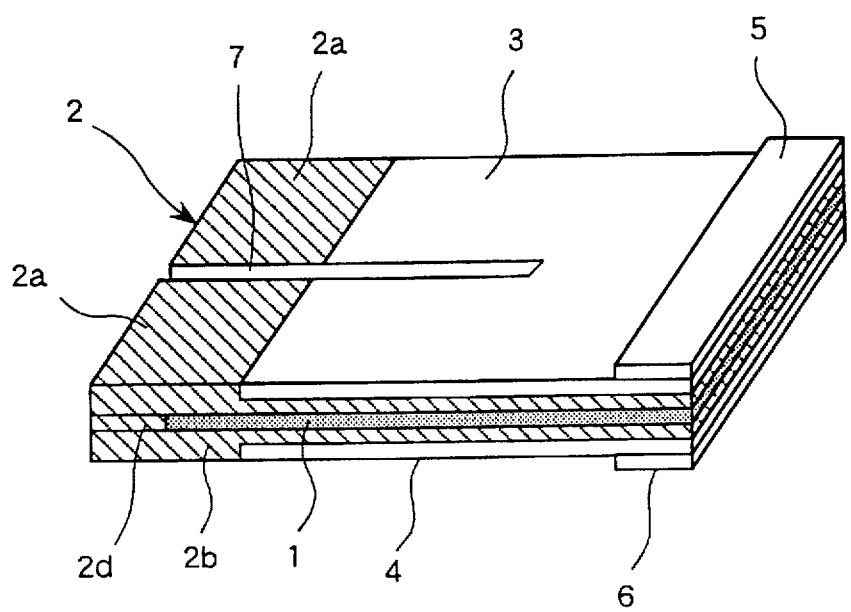

The rapid temperature rise heater element of FIG. 5, 7 or 8 is preferably configured as a generally rectangular plate and includes a sintered insulating ceramic layer 1, an exothermic section 2, and first and second lead layers 3 and 4. The overall configuration of the element is preferably a plate as mentioned above although it may take another form like a cylinder. The exothermic section 2 includes first and second sintered high-resistance, conductive ceramic layers 2a and 2b which are formed on the entire area (FIG. 5) or selected areas (FIG. 7) of the upper and rear surfaces of the sintered insulating ceramic layer 1 from a relatively high resistance, conductive ceramic material into a planar or curvilinear plate form and a connecting portion 2c which is formed integrally with the first and second sintered high-resistance, conductive ceramic layers 2a and 2b from a relatively high resistance, conductive ceramic material such as to form an electric current path which extends from one to the other of the first and second sintered high-resistance, conductive ceramic layers 2a and 2b around a portion of the periphery of the sintered insulating ceramic layer 1, the distal edge of the sintered insulating ceramic layer 1 in the illustrated embodiments. The distal edge is the left edge in FIGS. 5, 7, and 8.

The first and second lead layers 3 and 4 are formed contiguous to the first and second sintered high-resistance, conductive ceramic layers 2a and 2b. In the embodiments of FIGS. 5 and 8, steps are provided in the first and second sintered high-resistance, conductive ceramic layers 2a and 2b and the first and second lead layers 3 and 4 are formed on those rear reduced thickness portions of the first and second sintered high-resistance, conductive ceramic layers 2a and 2b which extend rearward from the steps to the rear ends. In the embodiment of FIG. 7 wherein the first and second sintered high-resistance, conductive ceramic layers 2a and 2b are limited to the selected areas of the sintered insulating ceramic layer 1, the first and second lead layers 3 and 4 are formed on the rear portion of the sintered insulating ceramic layer 1 such that they form surfaces flush with the opposed surfaces of the first and second sintered high-resistance, conductive ceramic layers 2a and 2b. In this construction, the rapid temperature rise heater element of the invention is preferably configured as a generally rectangular plate as illustrated in the figures and has the exothermic section 2 formed at the longitudinally distal end of the plate.

On the first and second lead layers 3 and 4 are formed electrode layers or terminal electrodes 5 and 6 of a metal for external connection. The electrode layers 5 and 6 may be disposed at any position on the first and second lead layers 3 and 4. Desirably, the electrode layers 5 and 6 are disposed at or near the other end of the rapid temperature rise heater element which is opposite to the one end where the exothermic section 2 is formed, avoiding the electrode layers 5 and 6 from being heated to high temperature.

If the connection portion 2c of the exothermic section 2 is of an increased size, there can be a situation where only the first and second sintered high-resistance, conductive ceramic layers 2a and 2b develop heat, depending on the relative areas of the components. In this situation, a sandwich structure having centrally interleaved a layer 2d having a higher resistance may be provided as shown in FIG. 8 so that the connecting portion 2c will fully develop heat.

As clearly shown in FIGS. 5 to 8, the element is provided with stress relieving means in the exemplary form of a slit 7. Desirably the slit 7 extends longitudinally through the exothermic section 2 from the distal (left) end of the element toward the electrodes 5 and 6, that is, along the current path. The slit structure is equivalent to a structure wherein the exothermic section or its electrical resistance is divided into two parallel parts. The slit does not induce a substantial change in the overall resistance value of the exothermic section. In a depth or height direction, the slit 7 extends throughout the first and second sintered high-resistance, conductive ceramic layers 2a, 2b and sintered insulating ceramic layer 1. The slit 7 need not reach the distal end. Also the slit 7 need not necessarily reach the lead layers 3 and 4. Differently stated, it suffices that only the exothermic section be provided with a slit extending a longitudinal partial distance thereof. Most preferably, the slit 7 should extend throughout the exothermic section 2 and further rearward (rightward) through the lead layers 3 and 4 as shown in FIGS. 5, 7 and 8. The slit 7 has a width of about 0.1 to 2 mm, preferably about 0.1 to 1 mm though not critical.

The stress relieving space in the ceramic heater element may have any desired shape as long as it can mitigate stresses induced in the exothermic section without causing a substantial change in the resistance value thereof. Then the space may be either a slit as mentioned above or a plurality of small apertures uniformly distributed over the entire area of the exothermic section. By providing the rapid temperature rise heater element with a stress relieving space or slit, the element is freed from cracking or crazing during operation even when it is of relatively large size.

As in the preceding embodiments, the ceramic heater element of the invention is desirably covered on its outer surface with a protective film which is chemically and thermally stable, heat resistant, and oxidation resistant though not shown.

The composition, formation, and dimensions of the respective layers and protective film are the same as previously described in conjunction with FIGS. 1 to 3.

Briefly stated, the sintered insulating ceramic layer 1 and the exothermic section 2 (that is, first and second sintered high-resistance, conductive ceramic layers 2a, 2b and connection portion 2c) are formed of ceramic compositions composed mainly of a first insulating component in the form of a metal oxide and a second conductive component in the form of a metal silicide and/or a metal carbide. The first insulating component occupies the majority for the insulating ceramic layer 1 whereas the second conductive component occupies more for the exothermic section 2. The metal oxide, metal silicide and metal carbide may be selected from the same examples as previously mentioned.

The blend ratio of the first insulating component to the second conductive component in the exothermic section 2 (excluding the sintered insulating ceramic layer 1), which is largely affected by the particle size distribution, is desirably set to give a volume ratio of from 7.5:2.5 to 5.5:4.5, more preferably from 7:3 to 6:4 provided that these powders have a mean particle size of about 0.2 to 2 μm. If the content of the second conductive component is less than 25% by volume, the mix material would have a too high resistance. If the content of the second conductive component exceeds 45% by volume, the mix material would have a too low resistance to generate a proper amount of heat.

Where the exothermic section 2 has the structure shown in FIG. 8, the high resistance layer 2d portion contains the first insulating component in a higher ratio than the remaining portion so that the layer 2d has a higher resistance. The ratio of the first insulating component in the layer 2d is determined by the resistance values of the first and second sintered high resistance conductive ceramic layers 2a and 2b and the connecting portion 2c which are, in turn, calculated on the basis of their dimensions.

Where silicon carbide and titanium carbide are not used as the second conductive component in forming the respective layers, the ceramic compositions may contain up to 2% by weight of silicon carbide and/or titanium carbide. Preferably the first insulating component and second conductive component have a particle size of about 0.1 to 50 μm and about 0.5 to 50 μm, respectively.

The above-mentioned rapid temperature rise heater element with a slit are fabricated as follows.

At the initial, source material powders, slurries, and green sheets are successively prepared by following the procedures previously described in conjunction with FIGS. 1 to 3.

The green sheets are then stacked so as to provide any of the cross-sectional structures shown in FIGS. 5, 7 and 8. Layer build-up is preferably carried out by thermocompression bonding under a pressure of about 50 to 2,000 kg/cm$^2$ and a temperature of about 50° to 150° C. Layer build-up can be done without forming sheets, that is, by repeatedly applying the respective slurries by a screen printing technique.

Then, the layered structure is cut into strips conforming to the final heater element configuration. Thereafter, using a rotary cutter, a slit is machined in the strip or element. Alternatively, using a punching machine, a plurality of small apertures are perforated in the strip.

After cutting and slitting or perforation, discrete elements are subject to binder removal and firing under the same conditions as previously mentioned in the first form.

On the surface of the thus sintered body, a protective film is applied. This coating may be effected by dipping the sintered body in a dispersion of a coating material or a metal alkoxide solution or an alkoxide solution having a coating material dispersed therein. If the coating material is silica, a silicone resin is applied to the surface of the sintered body, followed by firing.

Finally, silver or suitable metal paste is applied and baked to the surface of the first and second lead layers at predetermined positions to form terminal electrodes, completing the manufacture of a rapid temperature rise heater element. Further, the terminal electrodes may be electrically connected to lead wires or fitted in a socket.

The thus fabricated rapid temperature rise heater element of the invention also finds use as gas igniters and has a drive voltage of about 12 to 400 volts which is commensurate with automotive batteries.

Figure 9:
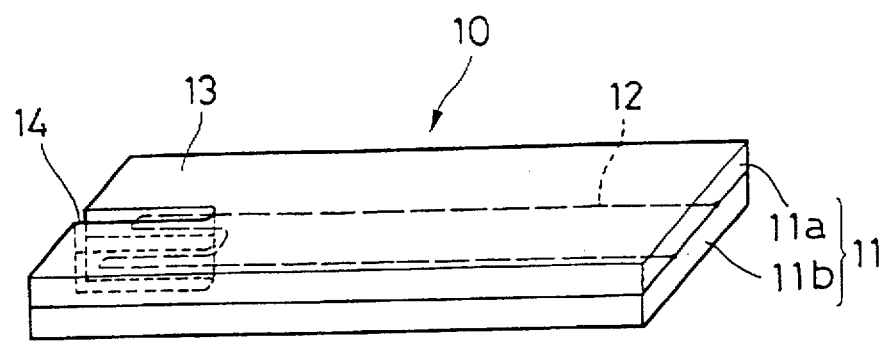
FIG. 9 is a perspective view of a further exemplary rapid temperature rise heater element having a stress relieving slit according to the fifth form of the present invention.
Figure 10:
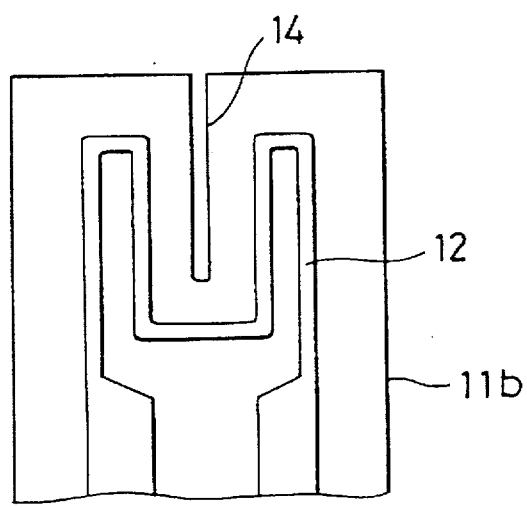
FIG. 10 is an enlarged plan view of the exothermic section of the heater element shownlin FIG. 9.

The stress relieving means contemplated in the fifth form of the invention is applicable not only to the ceramic rapid temperature rise heater elements shown in FIGS. 5 to 8, but also to a ceramic rapid temperature rise heater element of another structure as shown in FIGS. 9 and 10.

In FIG. 9, the ceramic rapid temperature rise heater element generally designated at 10 is of rectangular shape and includes a ceramic insulator 11 having upper and lower layers 11a and 11b and an exothermic resistor 12 (in the form of a thin wire strip as shown by phantom lines) embedded in the insulator 11. More particularly, the exothermic resistor 12 is interleaved between the upper and lower layers 11a and 11b. An exothermic section 13 is defined in one end portion of the element 10. The exothermic resistor 12 is configured to a generally M shape in the exothermic section 13 as best shown in FIG. 10. The element 10 at the one end portion is provided with a stress relieving means in the exemplary form of a slit 14. The slit 14 desirably extends into the recess of the M shape of the exothermic resistor 12 as best shown in FIG. 10. The stress relieving space may have any location and shape insofar as the exothermic resistor 12 is not split thereby. Therefore, in the embodiment the stress relieving means may also take the form of a plurality of apertures. It is understood that in the ceramic rapid temperature rise heater element of this structure, the insulator 11 need not have both the upper and lower layers, the use of a single insulator layer being acceptable.

Sixth form

Most often the ceramic heater elements of the foregoing embodiments are fabricated using green sheets for the respective layers. The green sheets are generally prepared from slurry by means of a doctor blade apparatus. A typical, preferred embodiment of the doctor blade apparatus is illustrated in FIGS. 11 to 15.

The doctor blade apparatus generally designated at 30 is used to form a plurality of slurry layers on a base film 31 traveling in one horizontal direction. The apparatus 30 includes a container 32 disposed on the base film in close contact therewith. The container 32 has vertical walls 33, 34, 35, and 36 defining a generally rectangular shape in a horizontal cross section. More particularly, the container 32 is contoured by a pair of spaced apart side walls 33 and 34 extending in the base film travel direction and a pair of front and rear walls 35 and 36 spaced apart in the base film travel direction. The walls are fixedly joined to adjacent ones at their edges with adhesive or mechanical fastening means. The rear wall 36 is a downstream wall of the container 32 in the travel direction of the base film 31.

The lower side or edge of the rear wall 36 is vertically spaced a predetermined distance from the base film 31 so that the lower edge serves as a doctor blade 37. Between the doctor blade 37 and the base film 31 is defined a gap 38 for allowing slurry to outflow. Preferably the doctor blade 37 is provided separately from the rear wall 36 so that the doctor blade 37 may be vertically movable for adjusting the gap 38 for allowing green sheets of different thicknesses to be formed. Alternatively, the rear wall 36 having the doctor blade 37 integrally formed therewith is vertically movable.

Figure 11:
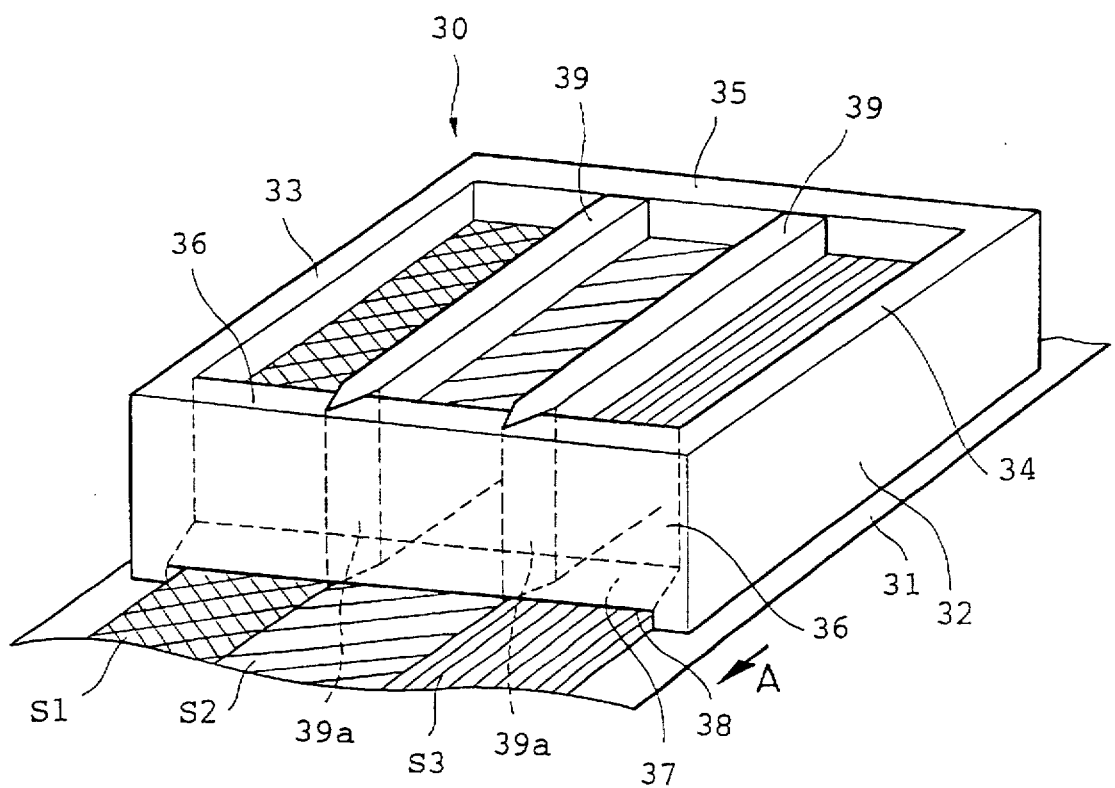
FIG. 11 schematically illustrates a doctor blade apparatus used in forming a ceramic green sheet having different regions.
Figure 12:
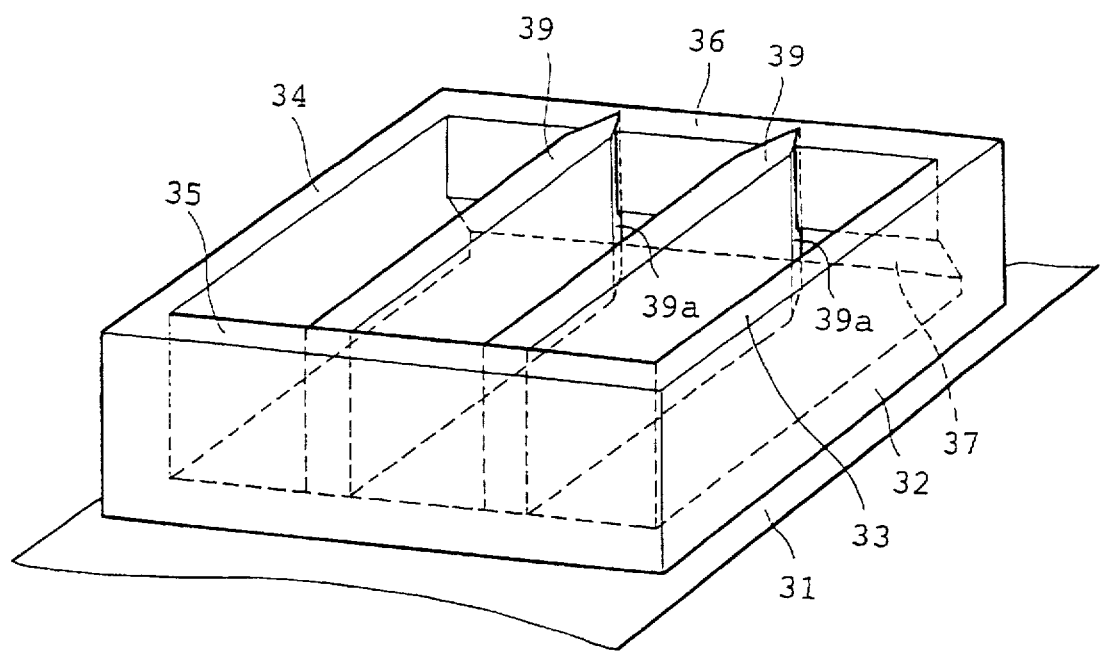
FIG. 12 is a perspective view of the doctor blade apparatus as viewed from the upstream side of the base film travel direction.
Figure 13:
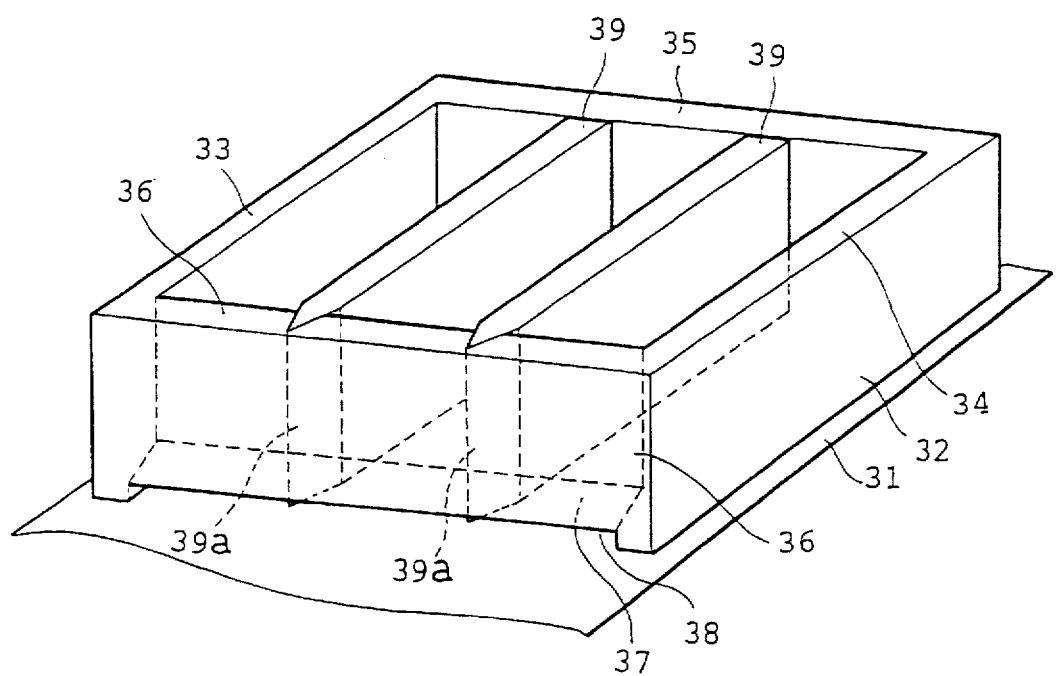
FIG. 13 is a perspective view of the doctor blade apparatus as viewed from the downstream side of the base film travel direction.
Figure 14:
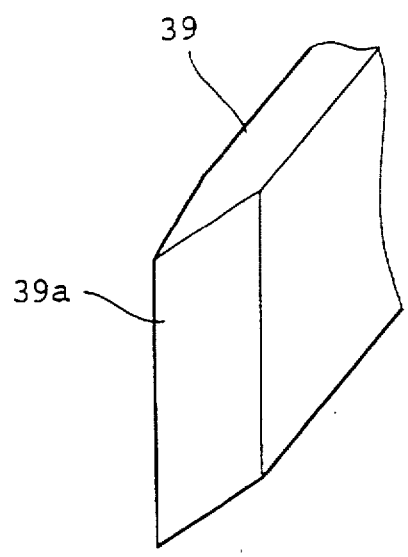
FIG. 14 is a perspective view of a partition in the doctor blade apparatus.

The container 32 is partitioned into a plurality of slurry receiving compartments 40 by at least one partition 39 which is disposed in the container and extends in the traveling direction of the base film or parallel to the side walls 33, 34 (two partitions 38 shown in FIG. 11). The partition 39 includes a downstream end or slurry outflow portion 39a having a transverse width which is tapered to a point in the traveling direction of the base film as best shown in FIG. 14. That is, the transverse width of the portion 39a is gradually reduced in the slurry outflow direction. This tapering to a point ensures that green sheet regions applied by the doctor blade 37 adjoin to adjacent ones at their edges.

Figure 15:
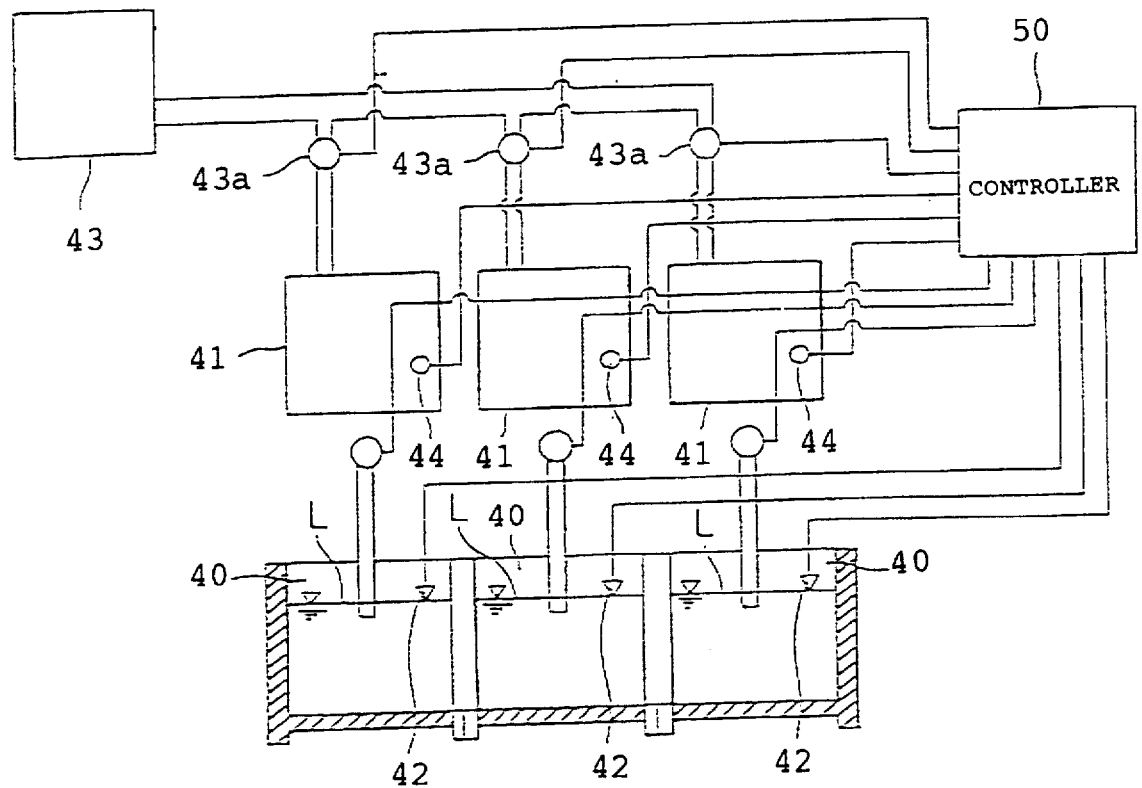
FIG. 15 is a block diagram showing a control system associated with the doctor blade apparatus of FIG. 11.

A control system is provided in conjunction with the doctor blade apparatus 30 as ishown in FIG. 15. Feed means in the form of tanks 41 are provided for feeding slurries to the respective compartments 40. Level detectors 42 are associated with the respective compartments 40 for detecting the level of slurry therein.

A controller 50 is coupled with the feed tanks 41 and the detectors 42 for controlling the level of slurry in each compartment constant. Upon receipt of a level detection signal from a detector 42, the controller 50 delivers a control signal to the corresponding feed tank 41 to feed a controlled amount of slurry to the corresponding compartment 40, thereby maintaining the levels of slurries in the compartments 40 at an approximately equal predetermined height.

Additionally, as shown in FIG. 15, each slurry feeder 41 is coupled with a solvent feed tank 43 (which is common to all the feeders in FIG. 15) and provided with a slurry viscometer 44. The controller 50 is also coupled with the tank 43 and the viscometer 44. Upon receipt of a slurry viscosity signal from a viscometer 44, the controller 50 delivers a control signal to a corresponding valve 43a associated with the solvent feed tank 43 for opening and closing the valve 43a to feed a controlled amount of solvent to the corresponding tank 41, thereby adjusting the slurry in each feed tank 41 to a predetermined viscosity.

In operating the doctor blade apparatus, the compartments are charged with slurries of different compositions or containing different materials. The base film is moved across the apparatus. Then as shown in FIG. 11, a plurality of strip segments S1, S2 and S3 of different compositions are applied to the base film 31 concurrently and in parallel. The strip segments S1, S2 and S3 adjoin adjacent ones along their sides. As a result, there is obtained a ceramic green sheet including strip segments of different compositions joined along the adjacent sides.

With this method and apparatus, ceramic green sheet segments adjoin adjacent ones along their longitudinal edges immediately after they are applied or coated. Then the materials intermix at the boundary to integrate the segments. This ensures a firm close joint between adjacent ceramic green sheet segments.

The slurries from which the ceramic green sheet segments are formed are prepared by selecting source powders for the respective layers, adding a binder, plasticizer, solvent and other additives to the powder mix, and mixing the ingredients. Preferably the slurries are adjusted to a viscosity of about 5 to 50 Ps, more preferably about 15 to 25 Ps, depending on the width of the respective ceramic green sheet segments.

In an exemplary two-color application, two pastes are desirably adjusted to have viscosities as close to each other as possible. More preferably, the two pastes are adjusted to have a viscosity difference within about ±1 Ps because stability upon casting is expectable.

The slurries are received in the compartments to an approximately equal and constant height. Then the slurries are applied under an equal and constant pressure, preventing warpage of the edges of ceramic green sheet segments.

In the practice of the invention, mutually miscible solvents, especially an identical solvent can be used in preparing the slurries from which the ceramic green sheet segments are formed. Exemplary solvents include alcohol solvents such as methanol, ethanol and isopropyl alcohol, aromatic solvents such as toluene, benzene and xylene, ketone solvents such as acetone, ether solvents, and halogenated solvents such as methylene chloride.

Figure 16:
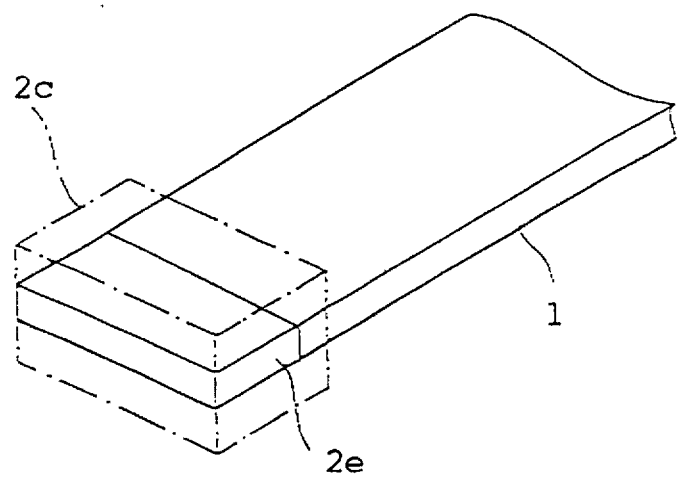
FIG. 16 is a perspective view showing one layer in the rapid temperature rise heater element.

The doctor blade apparatus mentioned above is especially suitable for use in forming a green sheet including two different regions as shown in FIG. 16. The green sheet shown in FIG. 16 includes a sintered insulating ceramic layer 1 and a portion 2e of a connecting portion 2c within the confine of an exothermic section 2, the layer 1 and the portion 2e forming an integral sheet on a common plane. Using this sheet, a ceramic rapid temperature rise heater element of the structure shown in FIG. 1, for example, is fabricated. The resulting heater element has been fully described in this disclosure. Of course, the heater element may have a stress relieving means in the exemplary form of a slit as shown in FIG. 5.

With respect to the raw materials, composition, and preparation of the slurries, reference should be made to the foregoing description taken conjunction with the first to fifth forms of the invention.

It is now described how to fabricate a ceramic rapid temperature rise heater element using the doctor blade apparatus of the sixth form of the invention. The fabrication of a ceramic heater element of the structure shown in FIG. 1 is described although the invention is not limited thereto.

First of all, source materials are prepared for the sintered insulating ceramic layer, exothermic section and lead layer. More particularly, a first insulating component and a second conductive component both in powder form are weighed in accordance with the blend ratios desired for the sintered insulating ceramic layer, exothermic section and lead layer. A binder, solvent and other necessary additives are added to the powder mixtures.

The combined ingredients are mixed in a ball mill, for example, to form insulating, resistive and conductive slurries. The milling time is about 3 to 24 hours, for example. Using these slurries, five green sheets G1 to G5 are formed as shown in FIG. 1. As seen from FIG. 1, outermost green sheets G1 and G5 each include a green sheet segment formed from the resistive slurry and another green sheet segment formed from the conductive slurry. The center green sheet G3 includes a green sheet segment formed from the resistive slurry and another green sheet segment formed from the insulating slurry. The interleaving green sheets G2 and G4 are formed solely from the resistive slurry. Then green sheets G1, G3, and G5 are formed using the doctor blade apparatus of the sixth form of the invention.

In forming a green sheet consisting of a plurality of ceramic green sheet segments like green sheets G1, G3, and G5, the slurry feed tanks 41 are charged with a desired number of slurries and deliver the slurries to the corresponding compartments 40 of the apparatus while adjusting the viscosity thereof. Then a green sheet consisting of segments is formed on a base film by means of the doctor blade apparatus 30. Plain green sheets like green sheets G2 and G4 formed of a single composition may be prepared by any conventional technique such as doctor blade and extrusion techniques. The green sheets have a thickness which is previously determined by calculation such that the layers as fired may have a thickness in the desired range.

The green sheets are then stacked so as to provide the cross-sectional structure shown in FIG. 1. Layer build-up is preferably carried out by thermo-compression bonding under a pressure of about 50 to 2,000 kg/cm² and a temperature of about 50° to 150° C.

Thereafter, the layered structure is cut into strips conforming to the final heater element configuration. This step requires cutting along the four sides of a rectangular strip at the maximum.

After cutting, discrete elements are subject to binder removal and firing. The binder removal is desirably carried out under the following conditions, for example, a heating rate of 6°–300° C./hour, especially 30°–120° C./hour; a holding temperature of 250°–380° C., especially 300°–350° C.; a holding time of 1–24 hours, especially 5–20 hours; and an atmosphere of air, nitrogen gas, argon gas or nitrogen gas-steam mixture. The firing is desirably carried out under the following conditions, for example, a heating rate of 300°–2000° C./hour, especially 500°–1000° C./hour; a holding temperature of 1400°–1700° C., especially 1500°–1650° C.; a holding time of ½–3 hours, especially 1–2 hours; and a cooling rate of 300°–2000° C./hour, especially 500°–1000° C./hour. The firing atmosphere may be vacuum, argon gas, helium gas, hydrogen gas or nitrogen gas. The binder removal and firing may be carried out either independently or continuously.

Finally, silver or suitable metal paste is applied and baked to the surface of the first and second lead layers at predetermined positions to form terminal electrodes, completing the manufacture of a rapid temperature rise heater element. Further, the terminal electrodes may be electrically connected to lead wires or fitted in a socket.

As previously described, the thus fabricated rapid temperature rise heater element of the invention finds use as gas igniters and has a drive voltage of about 12 to 400 volts which is commensurate with automotive batteries.

EXAMPLE

Examples of the present invention are given below by way of illustration and not by way of limitation.

Example 1

For the ceramic compositions of which the sintered insulating ceramic layer, exothermic section, and first and second lead layers were formed, aluminum oxide $Al_2O_3$ and molybdenum disilicide $MoSi_2$ were commonly used as major components and blended as follows.

|  | $Al_2O_3$ | $MoSi_2$ |
| --- | --- | --- |
| Sintered insulating ceramic layer | 95 vol % | 5 vol % |
| Exothermic section | 70 vol % | 30 vol % |
| First and second lead layers | 20 vol % | 80 vol % |
| Powder's mean particle size | 0.4 μm | 2 μm |
| Binder | methacrylic binder | |
| Solvent | toluene | |

Using a ball mill, the ingredients were mixed for 24 hours to form slurries. Green sheets were formed from these slurries by a doctor blade technique. The sheets were stacked in a mold in a layer arrangement as shown in FIG. 1. The stack was compacted at a pressure of 800 kg/cm² and a temperature of 60° C. so that the resulting element might have an overall thickness as shown in Table 1 after firing.

The compact was cut to dimensions as shown in Table 1 (the indicated dimensions were those after firing) so as to provide the layer structure shown in FIG. 1 (excluding the terminal electrodes).

The cut compact was subject to binder removal in a nitrogen gas atmosphere by heating to 350° C. at a rate of 1° C./min., holding at the temperature for 5 hours, then heating again to 900° C. at a rate of 5° C./min., holding at the temperature for 2 hours, and then cooling at 5° C./min. The binder-free compact was then fired in vacuum by heating to 1,650° C. at a rate of 5° C./min., holding at the temperature for 1 hour, and thereafter cooling at a rate of 300° C./min. After the compact was cooled to 800° C., it was allowed to cool in the furnace.

The resulting element was coated with silicone over the entire surface and subjected to heat treatment in air at 1,300° C. for 1 hour to form a silica protective film of about 1 μm thick. Portions of the protective film where terminal electrodes were to be attached were abraded off by sand blasting and silver paste was baked to those portions to form terminal electrodes. In this way, there were obtained rapid temperature rise heater element samples, Nos. 12 to 19 (inventive samples: Nos. 12 and 13, comparative samples: Nos. 14 to 19). Also prepared was a rapid temperature rise heater element sample, No. 11 within the scope of the invention in which the sintered insulating ceramic layer, exothermic section, and first and second lead layers were formed from the respective slurries by a screen printing technique. In all the samples, the exothermic section and the lead layers had a resistance ratio of 50:1.

The samples were measured for a temperature rise time from room temperature to 1,100° C. with a voltage of 20 V applied, a crack occurrence (per 100 specimens) by repeatedly applying a voltage of 20 V over 10,000 cycles, one cycle consisting of 10 second electric conduction and 1-minute interval, and a percent change of resistance by holding at 1,500° C. for 50 hours. The results are shown in Table 1.

TABLE 1

| Sample No. | Element dimensions | | | Rise time to 1100° C. (sec.) | Crack occurrence | Resistance change (%) |
|---|---|---|---|---|---|---|
| | Thick (μm) | Width (μm) | Length (mm) | | | |
| 11 | 100 | 200 | 15 | 1 | 0 | 3 |
| 12 | 800 | 1800 | 35 | 2 | 0 | 1 |
| 13 | 2000 | 5000 | 70 | 10 | 0 | 0.5 |
| 14* | 40 | 200 | 15 | <1 | 0 | 20 |
| 15* | 20 | 100 | 15 | <1 | 0 | 10 |
| 16* | 20 | 200 | 10 | 1 | 0 | 80 |
| 17* | 3000 | 5000 | 70 | 18 | 3 | <1 |
| 18* | 2000 | 7000 | 70 | 20 | 5 | <1 |
| 19* | 2000 | 5000 | 100 | 25 | 5 | <1 |

*comparison

As seen from Table 1, inventive sample Nos. 11 to 13 had a room temperature to 1,100° C. rise time within 10 seconds, a crack occurrence of 0%, and a resistance change within 5%. Comparative samples could not satisfy one or more of the requirements: a rise time within 10 seconds, crack occurrence of 0%, and a resistance change within 5%. In sample Nos. 11 to 13, the exothermic section occupied 10 to 20% of the entire volume of the element.

Example 2

Sample Nos. 21 to 24 were fabricated by the same procedure as Example 1 except that the element was dimensioned to 800 μm thick, 1,800 μm wide, and 35 mm long and the blend ratio between Al₂O₃ and MoSi₂ was changed as shown in Table 2. These samples were measured for a temperature rise time and a percent resistance change by the same test procedures as above. The results are shown in Table 2.

TABLE 2

| Sample No. | | Al₂O₃ | MoSi₂ | Rise time (sec.) | Resistance change (%) |
|---|---|---|---|---|---|
| 21* | Insulating section | 100 | 0 | 2 | 1 |
| | Exothermic section | 70 | 30 | | |
| | Lead section | 20 | 80 | | |
| 22 | Insulating section | 95 | 5 | 20 | <1 |
| | Exothermic section | 78 | 22 | | |
| | Lead section | 20 | 80 | | |
| 23 | Insulating section | 95 | 5 | 3 | 10 |
| | Exothermic section | 70 | 30 | | |
| | Lead section | 60 | 40 | | |
| 24 | Insulating section | 95 | 5 | 3 | 100 |
| | Exothermic section | 40 | 60 | | |
| | Lead section | 20 | 80 | | |

*preferable composition

As seen from Table 2, the inventive sample satisfied all the above-mentioned requirements whereas the comparative samples did not satisfy one or more of the requirements.

Example 3

Sample Nos. 30 to 40 were fabricated by the same procedure as sample No. 21 of Example 2 except that the first and second components of the ceramic compositions were changed and combined as shown in Table 3. These samples were measured for a temperature rise time and a percent resistance change by the same test procedures as above. The results are shown in Table 3.

TABLE 3

| Sample No. | 30 | 31 | 32 | 33 | 34 | 35 | 36 | 37 | 38 | 39 | 40** |
|---|---|---|---|---|---|---|---|---|---|---|---|
| First component | | | | | | | | | | | |
| Alumina | X | | | | | | | | | | |
| Zirconia | | X | | | | | X | | | | |
| Chromia | | | X | | | | | | | | |
| Titania | | | | X | | | | | | | |
| Tantalum oxide | | | | | X | | | | | | |
| Aluminum magnesium oxide | | | | | | X | | X | | | |
| Silica | | | | | | | | | X | | |
| Mulite | | | | | | | | | | X | X |
| Second component | | | | | | | | | | | |
| Molybdenum disilicide | X | | | | | X | X | X | X | X | X |

TABLE 3-continued

| Sample No. | 30 | 31 | 32 | 33 | 34 | 35 | 36 | 37 | 38 | 39 | 40** |
|---|---|---|---|---|---|---|---|---|---|---|---|
| Tungsten disilicide | | X | | | | | | | | | |
| Chromium silicide | | | X | | | | | | | | |
| Silicon carbide | | | | X | | | | | | | |
| Titanium carbide | | | | | X | | | | | | |
| Rise time (sec.) | 2 | 2 | 2 | 8 | 2 | 2 | 2 | 2 | 3 | 3 | 2 |
| Resistance change (%) | 1 | 1 | 1 | 3 | 4 | 1 | 1 | 1 | 3 | 1 | 1 |

*For No. 32, the resistance change was measured at 1,300°C.
**2 wt % $Y_2O_3$ added As seen from Table 3, the results obtained from different exemplary first and second components as the major components of ceramic compositions for the respective layers are equivalent to those of the combination of $Al_2O_3$ and $MoSi_2$.

Finally, the samples were covered with an alumina or chromia layer of 1 μm thick as a protective film. The test results were substantially equivalent to the above-reported results.

Example 4

To a mixture of $MoSi_2$ and $Al_2O_3$ in a volume ratio of 3/7, TiC was added in an amount of 0, 0.001, 0.01, 0.1, 1, 5, 10, and 15% by volume. The source powders had a mean particle size of 0.5 μm. A 1-liter alumina pot was charged with each mix in a total amount of 100 grams and ½ liter of alumina balls with a diameter of 5 mm. With ethanol added, the mix was wet milled for 24 hours. At the end of milling, the mix was poured into a high-temperature resin vat where it was dried at 100° C. in air. The mix was further fully mixed in an alumina mortar.

The mix was placed in a rod-shaped cavity of a mold and compacted under a pressure of 1 t/cm². Using a graphite heater, the compact was fired at 1,800° C. in an argon gas atmosphere. It was held at 1,800° C. for 2 hours and then allowed to cool.

Figure 17:
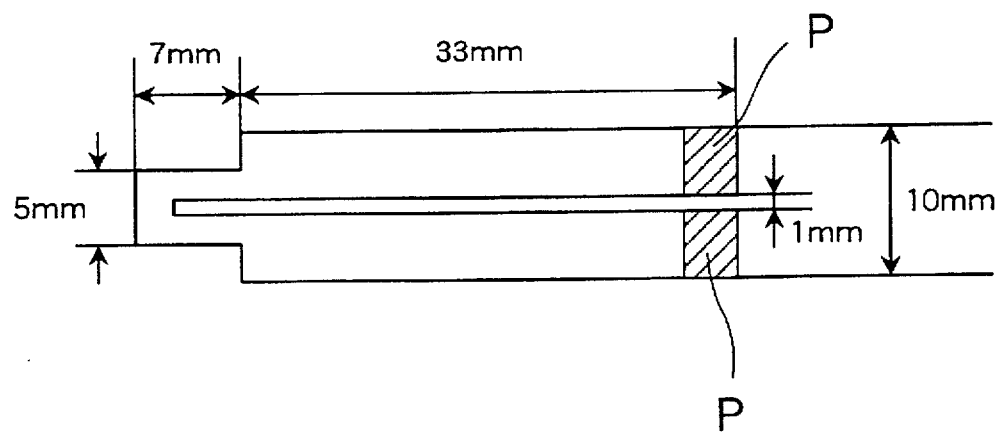
FIG. 17 is a plan view showing the structure of a ceramic heater element sample constructed in Example 4.

Using a diamond cutter, the sintered compact was machined to the shape shown in FIG. 17. As indicated in FIG. 17, the dimensions were 40 mm in overall length, 10 mm in overall width, and 1 mm in thickness.

The compact was heat treated at 1,400° C. in air for one hour to form a protective film of silica on the surface.

Selected portions of the silica film were removed by sand paper and Mo30-Ni70 (weight ratio) was baked thereto to form electrodes P as shown in FIG. 17. Nickel-clad copper conductor pieces were welded to the electrodes P. In this way, sample Nos. 41 to 48 were obtained.

The samples were measured for a resistance ratio R, a temperature rise time from room temperature to 1,000° C., and a saturation temperature. The resistance ratio R was determined by measuring the resistance Rr (in Q) of a sample at room temperature and the resistance R1100 (in Ω) at 1,100° C. by means of a digital multi-meter manufactured by Advanced Test Co. and dividing the resistance R1100 by the resistance Rr. Temperature was measured by a dichroic optical pyrometer manufactured by Chino K.K. The results are shown in Table 4.

TABLE 4

| Sample No. | Amount of TiC (vol %) | Rr | R1100 | R | Rise time to 1000° C. (sec) | Saturation temperature (°C.) |
|---|---|---|---|---|---|---|
| 41 | 0 | 5 | 21 | 4.2 | 7 | 1050 |
| 42 | 0.001 | 5 | 20 | 4 | 6 | 1100 |
| 43 | 0.01 | 5 | 15 | 3 | 3 | 1330 |
| 44 | 0.1 | 5 | 13.5 | 2.7 | 2 | 1400 |
| 45 | 1 | 5 | 10.5 | 2.1 | 2 | 1480 |
| 46 | 5 | 5 | 8 | 1.6 | 1 | 1520 |
| 47 | 10 | 5 | 5 | 1.0 | 1 | 1550 |
| 48 | 15 | 5 | 1.5 | 0.3 | 1 | continue to increase |

As seen from Table 4, those samples having 0.01 to 10% by volume of TiC added thereto had a resistance ratio R in the range between 3 and 1, provided a rapid temperature rise as demonstrated by a room temperature to 1,000° C. rise time within 3 seconds, and a maximum exotherm temperature limited below 1,600° C.

Additional heater element samples were prepared by the same procedure as above except that the additive was changed from TiC to ZrC, WC, TaC, NbC, HfC and MoC in the amount reported in Table 5. The resistance ratio R was similarly measured. The results are shown in Table 5.

TABLE 5

| Amount (vol %) | Resistance ratio R | | | | | |
|---|---|---|---|---|---|---|
| | Additive | | | | | |
| | ZrC | WC | TaC | NbC | HfC | MoC |
| 0.001 | 4 | 4 | 4 | 4 | 4 | 4 |
| 0.1 | 3.0 | 2.9 | 2.9 | 3.0 | 2.9 | 2.9 |
| 1 | 2.1 | 2.0 | 2.0 | 2.0 | 2.0 | 2.0 |
| 10 | 1.2 | 1.1 | 1.1 | 1.0 | 1.1 | 1.1 |
| 15 | 0.3 | 0.5 | 0.5 | 0.4 | 0.5 | 0.5 |

As seen from Table 5, similar results were obtained when the additive TiC was replaced by ZrC, WC, TaC, NbC, HfC and MOC.

Next, heater elements of the structure shown in FIG. 1 were fabricated and subjected to an exothermic test.

In this fabrication, aluminum oxide $Al_2O_3$ and molybdenum silicide $MoSi_2$ powders were commonly used as major components of ceramic compositions from which the sintered insulating ceramic layer, exothermic section, and lead layers were to be formed. These components were blended as shown below. The ceramic composition for the exothermic section was the same as sample No. 45 mentioned above. That is, 1% by volume of TiC was added thereto.

|  | $Al_2O_3$ | $MoSi_2$ |
|---|---|---|
| Sintered insulating ceramic layer (insulator layer) | 100 vol % | 0 vol % |
| Exothermic section (resistor layer) | 70 vol % | 30 vol % |
| First and second lead layers (conductor layer) | 20 vol % | 80 vol % |
| Powder's mean particle size | 0.4 μm | 2 μm |
| Binder | methacrylic binder | |
| Solvent | toluene | |

Using a ball mill, the ingredients were mixed for 24 hours to form slurries. Green sheets were formed from these slurries by a doctor blade technique. The sheets were cut to predetermined dimensions so that the structure of FIG. 1 might be constructed. The sheets were stacked in a mold in a layer arrangement. The stack was compacted at a pressure of 500 kg/cm² and a temperature of 120° C. to join the insulator, resistor and conductor layers together to provide a compact of the layer structure shown in FIG. 1 (excluding the terminal electrodes).

The compact was subject to binder removal in a nitrogen gas atmosphere in an alumina tubular furnace by heating to 1,000° C. at a rate of 1° C./min., holding at the temperature for 1 hour, and then allowing to cool down. The binder-free compact was then fired in an argon atmosphere by heating from room temperature to 1,400° C. in 1 hour, then heating from 1,400° C. to 1,800° C. in 30 minutes, holding at the temperature for 1 hour, and thereafter cooling at a rate of 300° C./min. After the compact was cooled to 800° C., it was allowed to cool in the furnace.

The resulting element was coated with silicone over the entire surface and subjected to heat treatment in air at 1,400° C. for 1 hour to form a dense silica protective film of about 1 μm thick. Selected portions of the protective film where terminal electrodes were to be attached were abraded off by sand blasting and silver paste was baked to those portions to form terminal electrodes. In this way, there were obtained rapid temperature rise heater element samples. The element was dimensioned to 2.0 mm wide, 25.0 mm long and 1.0 mm thick.

The samples were subject to an exothermic test under the following conditions.

Initial resistance: 5 Ω
Applied voltage: 20 V
Load: 27 W

With respect to exotherm temperature, the inventive samples reached 1,000° C. within 2 seconds and a maximum (saturation) temperature of 1,480° C. in 4 seconds after the start of electric conduction and dropped to about 90° C. in 20 seconds after the interruption of electric conduction. The element samples had a temperature coefficient of resistance falling in the region defined and encompassed by straight lines represented by R=T/1000 and R=3T/1000.

Example 5

Ceramic heater elements of the structure shown in FIG. 1 were fabricated. First, aluminum oxide $Al_2O_3$ and molybdenum silicide $MoSi_2$ powders were commonly used as major components of ceramic compositions from which the sintered insulating ceramic layer, exothermic section, and lead layers were to be formed. These components were blended as shown below.

|  | $Al_2O_3$ | $MoSi_2$ |
|---|---|---|
| Sintered insulating ceramic layer (insulator layer) | 100 vol % | 0 vol % |
| Exothermic section (resistor layer) | 70 vol % | 30 vol % |
| First and second lead layers (conductor layer) | 20 vol % | 80 vol % |
| Powder's mean particle size | 0.4 μm | 2 μm |
| Binder | methacrylic binder | |
| Solvent | toluene | |

Using a ball mill, the ingredients were mixed for 24 hours to form slurries. Green sheets were formed from these slurries by a doctor blade technique. The sheets were cut to predetermined dimensions so that the structure of FIG. 1 might be constructed. The sheets were stacked in a mold in a layer arrangement. The stack was compacted at a pressure of 500 kg/cm² and a temperature of 120° C. to join the insulator, resistor and conductor layers together to provide a compact of the layer structure shown in FIG. 1 (excluding the terminal electrodes). The compact was cut to predetermined dimensions. The compact was subject to binder removal in a nitrogen gas atmosphere in a furnace and then fired in an argon atmosphere at 1,800° C. for 2 hours. A Pd-Ag paste was applied to opposed end portions of the sintered compact, dried and baked at 1,000° C. to form electrodes. Nickel-plated soft copper conductor pieces were electrically welded to the electrodes. In this way, there were obtained heater element samples. The samples were dimensioned to 2 mm wide, 40 mm long and 1 mm thick while the exothermic section (defined remote from the electrodes) had a length of 7 mm in a longitudinal direction.

A voltage of 28 V was applied across one sample such that the maximum temperature region reached 1,700° C. and maintained one hour to form an oxide film on the maximum temperature region. During formation of this oxide film, the processing atmosphere was argon gas until the element temperature exceeded 600° C. and thereafter switched to air. The element sample was analyzed on the surface by electron probe microanalysis (EPMA) to find that a dense silicon oxide protective film covered the entire surface of the exothermic section and portions of the lead layers to a distance of about 4 mm from the boundary with the exothermic section, needle-shaped silicon oxide formed over an adjacent zone of about 1 mm, and no silicon oxide formed in the remaining surfaces extending to the electrodes. The silicon oxide film on the exothermic section was 10 μm thick.

The electrically conducted sample and the control (no electric conduction) sample were exposed to a flame of propane gas to examine the time taken when the percent resistance (at room temperature) change between before and after flame exposure exceeded 50%. The time was 20 hours in the case of the control sample. The electrically conducted sample had a resistance change of only 7% over 1,000 hours of flame exposure.

A protective film was similarly formed on another element sample except that the exotherm temperature was 900° C. A similar flame tolerance test was carried out to find that the electrical resistance increased 50% at 200 hours.

Samples were similarly treated to form a silicon oxide protective film except that the exotherm temperature during electric conduction was changed from 1,700° C. to 1,500° C., 1,300° C., 1,200° C. and 900° C. Electric conduction was maintained for one hour. The thus treated samples were operated by continuously conducting electricity to develop heat to a service temperature of 1,300° C. over 1,000 hours. At the end of the 1000-hour continuous heat development, the samples were measured for resistance, from which a percent resistance change was calculated. The results are shown in Table 6.

TABLE 6

| Protective film forming temperature (°C.) | Resistance change (%) |
|---|---|
| 1700 | 3 |
| 1500 | 5 |
| 1300 | 20 |
| 1200 | 30 |
| 900 | 80 |

It is thus evident that the self-heating temperature during electric conduction for forming a silicon oxide protective film should be above 1,000° C., desirably above the service or operating temperature.

Example 6

Preparation of electrode-forming paste

For the source material from which electrodes were to be formed, molybdenum (Mo) and nickel (Ni) were used as first and second components. They were both powders and had a mean particle size of 1 μm.

They were blended to provide six powder mixtures consisting of 100, 80, 70, 40, 10 and 0% by weight of Mo and the balance of Ni (that is, including 100% by weight Mo and 100% by weight Ni). To 200 grams of each mixture were added predetermined amounts of a methacrylic polymer binder and toluene solvent. A 1-liter alumina pot was charged with the ingredients and ½ liter of alumina balls with a diameter of 10 mm. The ingredients were milled for 24 hours to form an electrode-forming paste, which had a viscosity of 200 Ps.

Preparation of substrate and application of paste

A substrate in the form of a plate was prepared by mixing $MoSi_2$ and $Al_2O_3$ in a volume ratio of 8/2 and firing the mixture to 99% of the theoretical density. Both the source powders had a mean particle size of 0.5 μm.

The electrode-forming paste was applied by screen printing to the plate over an area of 2×2 mm (as baked). With five areas assigned to each type of paste, 30 areas in total were printed on one plate. At the end of printing, the pastes were dried in air at 150° C. for ½ hour.

Electrode baking

The plates having electrodes printed thereon were baked in a baking furnace with a graphite heater in an argon gas stream at temperatures of 1,000° C., 1,050° C., 1,100° C., 1,200°C., 1,300° C., 1,400° C., and 1,500° C. The heating time was 1 hour, the baking time was ½ hour, and the cooling was unforced cooling.

Test

Evaluation was made by measuring surface resistance and bonding force. The surface resistance was measured by setting two probes of a tester in contact with opposed edges of an electrode. The results are shown in Table 7.

TABLE 7

| Electrode composition | | | | | | |
|---|---|---|---|---|---|---|
| Mo (wt %) | 100 | 80 | 70 | 40 | 10 | 0 |
| Ni (wt %) | 0 | 20 | 30 | 60 | 90 | 100 |
| Heat treatment temperature (°C.) | Resistance (mΩ) | | | | | |
| 1000 | UM | UM | 0.2 | 0.3 | 0.1 | 0.1 |
| 1050 | UM | UM | 0.3 | 0.4 | 0.3 | 0.1 |
| 1100 | UM | $2.0 \times 10^7$ | 0.5 | 0.4 | 0.5 | 0.2 |
| 1200 | UM | $1.5 \times 10^7$ | 0.7 | 0.7 | 2.5 | UM |
| 1300 | UM | 20.3 | 0.9 | 2.3 | 5.7 | UM |
| 1400 | $2.0 \times 10^7$ | 5.7 | 3.8 | 8.0 | 9.0 | UM |
| 1500 | $1.5 \times 10^7$ | 2.1 | 57.9 | UM | UM | UM |

UM: too high resistance, unmeasurable with the tester

The bonding force was measured by applying adhesive tape to the electrode, stripping the tape therefrom and observing the state of the electrode. Samples were rated good (O) when the electrode was not separated, fair (Δ) when partially separated, and rejected (X) when entirely separated together with the adhesive tape. The results are shown in Table 8.

TABLE 8

| Electrode composition | | | | | | |
|---|---|---|---|---|---|---|
| Mo (wt %) | 100 | 80 | 70 | 40 | 10 | 0 |
| Ni (wt %) | 0 | 20 | 30 | 60 | 90 | 100 |
| Heat treatment temperature (°C.) | Adhesive tape test | | | | | |
| 1000 | x | x | x | x | Δ | Δ |
| 1050 | x | x | Δ | Δ | o | x |
| 1100 | x | o | o | o | o | x |
| 1200 | x | Δ | o | o | o | x |
| 1300 | x | x | o | o | Δ | x |
| 1400 | x | x | o | Δ | Δ | x |
| 1500 | x | x | x | x | x | x |

As seen from Tables 7 and 8, when Mo and Ni are used as first and second components of the electrode material, acceptable electrodes as demonstrated by a resistance of less than 10 mn and firm adherence are obtained by limiting the nickel content to 30 to 90% by weight with the balance of molybdenum and the baking temperature to the range of 1,050 to 1,400° C.

Example 7

Samples were prepared by the same procedure as in Example 6 except that the first and second components of the electrode material were changed as shown in Table 9 and all pastes were baked at 1,200° C. to form electrodes.

The samples were subject to a tensile strength test. One end of a copper wire having a diameter of 0.6 mm and a length of 50 mm was pressed to form an enlarged head in the form of a disk having a diameter of 1 mm. The wire was placed relative to the sample such that the head was in contact with the electrode surface (2×2 mm). With cream solder applied, a heat treatment was effected to solder the wire head to the electrode, completing a test specimen. The specimen was set in a tensile tester where with the sample fixedly secured, the wire was pulled upward perpendicular to the specimen. The pulling force when the sample was separated from the wire or the solder was measured.

Samples were rated according to the following criterion.

| Rating | Tensile strength |
| --- | --- |
| ⊙⊙ | >3 kg/cm² |
| ⊙ | 2–3 kg/cm² |
| Δ | 1–2 kg/cm² |
| x | <1 kg/cm² |

The results are shown in Table 9.

TABLE 9

| First component | | | | Second component | | | | |
| --- | --- | --- | --- | --- | --- | --- | --- | --- |
| Mo | W | Si | Total | Fe | Co | Ni | Total | Rating |
| 100 | — | — | 35 | — | — | 100 | 65 | ⊙⊙ |
| 80 | 10 | 10 | 35 | — | — | 100 | 65 | ⊙⊙ |
| 100 | — | — | 35 | 10 | 10 | 80 | 65 | ⊙⊙ |
| 100 | — | — | 25 | — | — | 100 | 75 | ⊙ |
| 100 | — | — | 15 | — | — | 100 | 85 | Δ |
| 100 | — | — | 45 | — | — | 100 | 55 | ⊙ |
| 100 | — | — | 60 | — | — | 100 | 40 | Δ |
| 100 | — | — | 80 | — | — | 100 | 20 | X |
| 100 | — | — | 5 | — | — | 100 | 95 | X |
| — | 100 | — | 50 | — | — | 100 | 50 | ⊙⊙ |
| 10 | 80 | 10 | 50 | — | — | 100 | 50 | ⊙⊙ |
| — | 100 | — | 50 | 10 | 10 | 80 | 50 | ⊙⊙ |
| — | 100 | — | 35 | — | — | 100 | 65 | ⊙ |
| — | 100 | — | 25 | — | — | 100 | 75 | Δ |
| — | 100 | — | 10 | — | — | 100 | 90 | X |
| — | 100 | — | 60 | — | — | 100 | 40 | ⊙ |
| — | 100 | — | 75 | — | — | 100 | 25 | Δ |
| — | 100 | — | 10 | — | — | 100 | 90 | X |
| — | — | 100 | 11 | — | — | 100 | 89 | ⊙⊙ |
| 10 | 10 | 80 | 11 | — | — | 100 | 89 | ⊙⊙ |
| — | — | 100 | 11 | 10 | 10 | 80 | 89 | ⊙⊙ |
| — | — | 100 | 7 | — | — | 100 | 93 | ⊙ |
| — | — | 100 | 4 | — | — | 100 | 96 | Δ |
| — | — | 100 | 2 | — | — | 100 | 98 | X |
| — | — | 100 | 16 | — | — | 100 | 84 | ⊙ |
| — | — | 100 | 30 | — | — | 100 | 70 | Δ |
| — | — | 100 | 40 | — | — | 100 | 60 | X |

It is evident from Table 9 that when Mo is the majority of the first component, the second component should preferably be contained in an amount of 30 to 90%, more preferably 50 to 80%, most preferably 60 to 70% by weight of the electrode material; when W is the majority of the first component, the second component should preferably be contained in an amount of 18 to 83%, more preferably 34 to 68%, most preferably 44 to 55% by weight of the electrode material; and when Si is the majority of the first component, the second component should preferably be contained in an amount of 65 to 97%, more preferably 81 to 95%, most preferably 87 to 91% by weight of the electrode material.

Ceramic heater elements of the structure shown in FIG. 1 were fabricated. First, aluminum oxide $Al_2O_3$ and molybdenum silicide $MoSi_2$ powders were commonly used as major components of ceramic compositions from which the sintered insulating ceramic layer, exothermic section and first and second lead layers were to be formed. These components were blended as shown below.

| | $Al_2O_3$ | $MoSi_2$ |
| --- | --- | --- |
| Sintered insulating ceramic layer (insulator layer) | 100 vol % | 0 vol % |
| Exothermic section | 70 vol % | 30 vol % |
| (resistor layer) | | |
| First and second lead layers (conductor layer) | 20 vol % | 80 vol % |
| Powder's mean particle size | 0.4 μm | 2 μm |
| Binder | methacrylic binder | |
| Solvent | toluene | |

Using a ball mill, the ingredients were mixed for 24 hours to form slurries. Green sheets were formed from these slurries by a doctor blade technique. The sheets were cut to predetermined dimensions so that the structure of FIG. 1 might be constructed. The sheets were stacked in a mold in a layer arrangement. The stack was compacted at a pressure of 500 kg/cm² and a temperature of 120° C. to join the insulator, resistor and conductor layers together to provide a compact of the layer structure shown in FIG. 1 (excluding the terminal electrodes).

The compact was subject to binder removal in a nitrogen gas atmosphere in an alumina tubular furnace by heating to 1,000° C. at a rate of 1° C./min., holding at the temperature for 1 hour, and then allowing to cool down. The binder-free compact was then fired in an argon atmosphere by heating from room temperature to 1,400° C. in 1 hour, then heating from 1,400° C. to 1,800° C. in 30 minutes, holding at the temperature for 1 hour, and thereafter cooling at a rate of 300° C./min. After the compact was cooled to 800° C., it was allowed to cool in the furnace.

The resulting element was coated with silicone over the entire surface and subjected to heat treatment in air at 1,400° C. for 1 hour to form a dense silica protective film of about 1 μm thick. Selected portions of the protective film where terminal electrodes were to be attached were abraded off by sand blasting and an electrode-forming paste of 40Mo–60Ni (Example 6) was baked to those portions at 1,200° C. to form terminal electrodes. In this way, there was obtained a rapid temperature rise heater element sample. The element was dimensioned to 2.0 mm wide, 25.0 mm long and 1.0 mm thick. The sample showed equivalent performance to the sample of Example 6.

Example 8

Ceramic heater elements of the structure shown in FIG. 5 were fabricated. First, aluminum oxide $Al_2O_3$ and molybdenum silicide $MoSi_2$ powders were commonly used as major components of ceramic compositions from which the sintered insulating ceramic layer, exothermic section and first and second lead layers were to be formed. These components were blended as shown below.

|  | $Al_2O_3$ | $MoSi_2$ |
| --- | --- | --- |
| Sintered insulating ceramic layer (insulator layer) | 100 vol % | 0 vol % |
| Exothermic section (resistor layer) | 70 vol % | 30 vol % |
| First and second lead layers (conductor layer) | 20 vol % | 80 vol % |
| Powder's mean particle size | 0.4 μm | 2 μm |
| Binder | methacrylic binder | |
| Solvent | toluene | |

Using a ball mill, the ingredients were mixed for 24 hours to form slurries. Green sheets were formed from these slurries by a doctor blade technique. The sheets were cut to predetermined dimensions so that the structure of FIG. 5 might be constructed. The sheets were stacked in a mold in a layer arrangement. The stack was compacted at a pressure of 500 kg/cm² and a temperature of 120° C. to join the insulator, resistor and conductor layers together to provide a compact of the layer structure shown in FIGS. 5 and 6 (excluding the terminal electrodes). There were prepared 100 compacts which were divided into two groups.

Using a dicing saw (diamond grit rotary cutter, 0.15 mm thick), fifty (50) compact samples were sawed with a slit which extended from the distal end of the exothermic section toward the electrodes as shown in FIG. 5.

The 100 compacts (50 plain compacts+50 slit compacts) were subject to binder removal in a nitrogen gas atmosphere in an alumina tubular furnace by heating to 1,000° C. at a rate of 1° C./min., holding at the temperature for 1 hour, and then allowing to cool down. The binder-free compacts were then fired in an argon atmosphere by heating from room temperature to 1,400° C. in 1 hour, then heating from 1,400° C. to 1,800° C. in 30 minutes, holding at the temperature for 1 hour, and thereafter cooling at a rate of 300° C./min. After the compact was cooled to 800° C., it was allowed to cool in the furnace.

The resulting elements were coated with silicone over the entire surface and subjected to heat treatment in air at 1,400° C. for 1 hour to form a dense silica protective film of about 1 μm thick. Selected portions of the protective film where terminal electrodes were to be attached were abraded off by sand blasting and a silver paste was baked to those portions to form terminal electrodes. In this way, there were obtained 100 rapid temperature rise heater element samples (50 plain elements+50 slit elements). The elements were dimensioned to 6.0 mm wide, 25.0 mm long and 1.0 mm thick. The slit was 0.2 mm wide. The halves of the exothermic section defined between the side wall and the slit and affording a current path were 2.9 mm wide.

The samples were subject to an exotherm test under the conditions: an initial resistance of 5 Ω, an applied voltage of 20 V, and a load of 27 W. An on-off test consisting of 10 seconds electric conduction and 20 seconds interruption was carried out.

With respect to exotherm temperature, both the plain and slit samples reached a maximum temperature of 1,250° C. in 5 seconds after the start of electric conduction and dropped to about 90° C. in 20 seconds after the interruption of electric conduction.

All of the 50 plain samples cracked within 3 seconds from the start of electric conduction. Cracks extended through the exothermic section in transverse and thickness directions. In contrast, all of the 50 slit samples were free of a crack even after repetition of 100,000 on-off tests.

Example 9

An insulating slurry was prepared by adding a methacrylic binder and toluene solvent to $Al_2O_3$ powder having a mean particle size of 0.4 pm and milling the ingredients. A resistive slurry was prepared by adding a methacrylic binder and toluene solvent to $MoSi_2$ powder having a mean particle size of 2 μm and milling the ingredients. From the insulating slurry, an insulating layer 11b was formed as shown in FIG. 10. Using the resistive slurry, a resistor pattern 12 was printed on the insulating layer 11b as shown in FIG. 10. The insulating slurry was applied thereon to cover the printed resistor 12 with another insulating layer (11a in FIG. 9). The layer structure was compacted at a pressure of 500 kg/cm² and a temperature of 120° C. to join the insulator, resistor and insulator layers together to provide a compact of the layer structure shown in FIG. 9. There were prepared 100 compacts which were divided into two groups.

Using a dicing saw (diamond grit rotary cutter, 0.15 mm thick), fifty (50) compact samples were sawed with a slit 14 which extended from the distal end of the exothermic section to the recess of the M-shaped resistor as shown in FIG. 10.

The 100 compacts (50 plain compacts+50 slit compacts) were subject to binder removal in a nitrogen gas atmosphere in an alumina tubular furnace by heating to 1,000° C. at a rate of 1° C./min., holding at the temperature for 1 hour, and then allowing to cool down. The binder-free compacts were then fired in vacuum by heating from room temperature to 1,600° C. over 3 hours, holding at the temperature for 1 hour, and thereafter cooling at a rate of 300° C./min. After the compact was cooled to 800° C., it was allowed to cool in the furnace. Those portions of a protective film covering the electrode terminals were abraded off by sand blasting and a silver paste was baked to those portions to form terminal electrodes. In this way, there were obtained 100 rapid temperature rise heater element samples (50 plain elements+ 50 slit elements). The elements were dimensioned to 6.0 mm wide, 25.0 mm long and 1.0 mm thick. The slit was 0.2 mm wide.

The samples were subject to an exotherm test under the same conditions as in Example 8. All of the slit samples retained normal operation even after repetition of 100,000 on off tests whereas all of the plain samples cracked.

Formation of a slit ensures manufacture of ceramic heater elements having improved thermal impact resistance and increased capacity.

Example 10

Ceramic heater elements of the structure shown in FIG. 1 were fabricated. First, aluminum oxide $Al_2O_3$ powder having a mean particle size of 1.0 μm as the first insulating component and molybdenum silicide MoSi$_2$ powder having a mean particle size of 2 to 5 μm as the second conductive component were weighed in accordance with the following blend ratios intended for the sintered insulating ceramic layer, exothermic section, and lead layers.

|  | Al$_2$O$_3$ | MoSi$_2$ |
| --- | --- | --- |
| Sintered insulating ceramic layer | 100 vol % | 0 vol % |
| Sintered high resistance conductive ceramic layer | 70 vol % | 30 vol % |
| Lead layers | 20 vol % | 80 vol % |

To the source powders were added 10 to 20% by weight of an acrylic binder, 2 to 5% by weight of a plasticizer in the for of n-butyl phthalyl or n-butyl glycolate, 15 to 20% by weight of ethanol solvent, and 30 to 40% by weight of toluene in accordance with the formulation for the respective layers. These ingredients were milled for 24 to 48 hours in a ball mill to form insulating, resistive and conductive slurries. The slurries were taken out of the mills, deaerated in vacuum and adjusted to a viscosity of 15 to 25 Ps.

A doctor blade apparatus as shown in FIG. 11 was assembled. When it was desired to form a sheet of two segments from two slurries of different compositions, the partition was set at a position corresponding to the widths of the insulating and conductive segments, for example. Then a doctor blade apparatus was specialized for a particular sheet. The viscosity adjusted slurries were supplied into the compartments and coated onto a base film to form a green sheet consisting of two strip segments. The sheet was about 100 μm thick. Three types of green sheets G1, G3 and G5 were obtained in this way. Also single composition sheets, that is, green sheets G2 and G4 were prepared from only the resistive slurry by a conventional doctor blade technique.

The green sheets were peeled off from the base films, stacked and subjected to thermo-compression bonding to provide the layer structure shown in FIG. 1.

The layer arrangement was cut to a predetermined shape and heat treated in a nitrogen atmosphere at 900° to 1,100° C. for 1 to 2 hours for removing organic matter. Then it was fired in an argon atmosphere at 1,700° to 1,800° C. for 1 to 2 hours. A Pd-Ag paste was baked to the sintered body at one end to form electrodes, to which a nickel-plated soft copper conductor pieces were spot welded. The sintered body was placed in a ceramic holder of steatite and bonded with high-temperature cement to complete a ceramic rapid temperature rise heater element.

The thus fabricated heater elements were subjected to temperature rise and thermal cycling tests. With a voltage of 15 V applied, the exothermic section reached 1,000° C. within about 2 seconds, indicating that the heater elements were capable of rapid temperature rise. The thermal cycling test between room temperature and 1,500° C. was carried out by applying a voltage of 20 V for 10 seconds and turning off for 20 seconds. Conventional heater elements failed at 10,000 cycles in the case of less durable elements and at 50,000 cycles in the case of relatively durable elements because cracks occurred at the boundary between different compositions and the electrical resistance increased at that point. The ceramic heater elements fabricated according to the invention were free of cracks and experienced a resistance change of less than 10% even at 100,000 cycles, indicating tolerance to thermal cycling.

Japanese Patent Application Nos. 200314/1993, 114460/1994, 114459/1994, 114461/1994, 114463/1994, and 114462/1994 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A rapid temperature rise heater element comprising a sintered insulating ceramic layer having opposite major surfaces, an exothermic section including first and second sintered resistance conductive ceramic layers formed on said sintered insulating ceramic layer by applying a resistance conductive ceramic material to at least portions of the opposite major surfaces thereof, respectively, and a connecting portion formed integrally with said first and second sintered resistance conductive ceramic layers from the resistance conductive ceramic material, an electric current path extending from said first to said second sintered resistance conductive ceramic layer through said connecting portion, and first and second lead layers disposed on the same opposite major surfaces as said first and second sintered resistance conductive ceramic layers or at least portions of the surfaces of said first and second sintered resistance conductive ceramic layers and electrically connected to said first and second sintered resistance conductive ceramic layers, said first and second lead layers each being a sintered conductive ceramic layer formed from a conductive ceramic material having a resistance lower than said first and second sintered resistance conductive layers, the element being dimensioned about 100 to 2,000 μm thick, about 200 to 5,000 μm wide, and about 15 to 70 mm long, said sintered insulating ceramic layer and said first and second sintered resistance conductive ceramic layers each having a thickness of about 1 to 1,000 μm, said exothermic section having a total thickness of about 100 to 2,000 μm.

2. A rapid temperature rise heater element comprising a sintered insulating ceramic layer, an exothermic section joined to said sintered insulating ceramic layer, and first and second lead layers for applying voltage across said exothermic section, said sintered insulating ceramic layer, said exothermic section, and said lead layers being formed of ceramic compositions composed substantially of a first insulating component in the form of a metal oxide and a second conductive component in the form of a metal silicide a metal carbide or a mixture thereof, the metal being the same as in said metal oxide, said first and second components being blended in a volume ratio of from 10:0 to 8:2 for said sintered insulating ceramic layer, from 7.5:2.5 to 5.5:4.5 for said exothermic section, and from 5:5 to 0:10 for said lead layers.

3. The heater element of claim 2 wherein said metal oxide is selected from the group consisting of aluminum oxide, zirconium oxide, chromium oxide, titanium oxide, tantalum oxide, silicon oxide, magnesium aluminum oxide, silicon aluminum oxide and mixtures thereof, said metal silicide is selected from the group consisting of molybdenum silicide, tungsten silicide, chromium silicide and mixtures thereof, and said metal carbide is selected from the group consisting of silicon carbide, titanium carbide and mixtures thereof.

4. The heater element of claim 2 or which further comprises a protective film covering the outer surface of the element, said protective film being chemically and thermally stable, heat resistant, and oxidation resistant and formed of at least one of silica, alumina or chromia.

5. The heater element of claim 1 or 2 wherein at least one of said sintered insulating ceramic layer, said exothermic section, and said lead layers contains up to 2% by weight of silicon carbide.

6. The heater element of claim 1 wherein said connecting portion includes at least three layers, among which an intermediate layer has a greater electrical resistance than outside layers.

7. The heater element of claim 6 wherein said intermediate layer has a thickness which is substantially equal to or different within ±20% from the thickness of said sintered insulating ceramic layer and is formed contiguous to the edge of said sintered insulating ceramic layer.

8. The heater element of claim 1 or 2 wherein said first and second lead layers have an electrical resistance which is not greater than 1/10 of the resistance of said exothermic section.

9. The heater element of claim 2 wherein at least one of said sintered insulating ceramic layer, said exothermic section or said lead layers contains up to 10% by weight of an oxide of an alkaline earth metal, yttrium or rare earth metal.

10. A rapid temperature rise heater element comprising an exothermic section which is formed of a sintered ceramic composition containing a molybdenum silicide-aluminum oxide mix material having a resistivity of $1 \times 10^{-2}$ to $5 \times 10^0$ $\Omega$cm as a major component and 0.01 to 10% by volume of at least one additive selected from the group consisting of carbides of Zr, W, Ta, Ti, Nb, Hf and Mo.

11. The heater element of claim 10 wherein when the ratio R of the resistivity of the exothermic section at a temperature of at least 1,000° C. to the resistivity of the exothermic section at 20° C. is plotted on the ordinate and the element temperature T (°C.) is plotted on the abscissa of a diagram, said exothermic section has a temperature coefficient of resistance falling within the region defined and encompassed by the line R=T/1000 and the line R=3T/1000 in the diagram.

12. The heater element of claim 10 which further comprises a protective film covering the outer surface of the element, said protective film being chemically and thermally stable, heat resistant, and oxidation resistant and formed of at least one of silica, alumina or chromia.

13. The heater element of claim 10, wherein said additive is present in an amount of 0.05 to 5% by volume.

14. A rapid temperature rise heater element comprising a sintered insulating ceramic layer having opposite major surfaces, an exothermic section including first and second sintered resistance conductive ceramic layers formed on said sintered insulating ceramic layer by applying a resistance conductive ceramic material to at least portions of the opposite major surfaces thereof, respectively, and a connecting portion formed integrally with said first and second sintered resistance conductive ceramic layers from the resistance conductive ceramic material, an electric current path extending from said first to said second sintered resistance conductive ceramic layer through said connecting portion, and firs t and second lead layers disposed on the same opposite major surfaces as said first and second sintered resistance conductive ceramic layers or at least port ions of the surfaces of said first and second sintered resistance conductive ceramic layers and electrically connected to said first and second sintered resistance conductive ceramic layers, said first and second lead layers each being a sintered conductive ceramic layer formed from a conductive material having a resistance lower than said first and second sintered resistance conductive ceramic layers, wherein the conductive ceramic material contains a silicide, said exothermic section has a silicon oxide protective film formed thereon, and the silicon oxide protective film extends only on said exothermic section and those portions of said first and second lead layers contiguous thereto.

15. A molybdenum silicide system material element comprising a main body of a material composed substantially of molybdenum silicide and a terminal electrode attached thereto of an electrode material containing a first component selected from the group consisting of Mo, W, Si and mixtures thereof, and a second component selected from the group consisting of Fe, Co, Ni and mixtures thereof.

16. The element of claim 15 wherein said electrode material contains Mo in an amount of 70 to 100% by weight of the first component and the second component in an amount of 30 to 90% by weight of the total weight of said electrode material.

17. The element of claim 15 wherein said electrode material contains W in an amount of 70 to 100% by weight of the first component and the second component in an amount of 18 to 83% by weight of the total weight of said electrode material.

18. The element of claim 15 wherein said electrode material contains Si in an amount of 70 to 100% by weight of the first component and the second component in an amount of 65 to 97% by weight of the total weight of said electrode material.

19. The element of claim 16, 17 or 18 wherein said terminal electrode is formed by baking said electrode material to said main body at a temperature in the range of 1,050° to 1,400° C. in claim 16, 1,100° to 1,450° C. in claim 17 or 950° to 1,300° C. in claim 18.

20. The element of claim 16, 17 or 18 wherein said electrode material contains Ni in an amount of 70 to 100% by weight of the second component.

21. A rapid temperature rise heater element having opposite ends, comprising an insulating ceramic layer, a resistance body joined to said insulating layer, and a pair of electrodes disposed at one end of said heater element, wherein said resistance body defines an exothermic section at the end opposite to where the electrodes are disposed, and said exothermic section is provided with means form relieving stress, said stress relieving means including at lest one slit or a plurality of small apertures.

22. The heater element of claim 21 wherein said stress relieving means is at least one slit extending along a current path which extends through said resistance body between said electrodes.

* * * * *

UNITED STATES PATENT AND TRADEMARK OFFICE
CERTIFICATE OF CORRECTION

PATENT NO. : 5,756,215
DATED: : MAY 26, 1998
INVENTOR(S) : SAWAMURA ET AL

It is certified that error appears in the above-identified patent and that said Letters patent is hereby corrected as shown below:

Column 46, line 51, after "silicide" insert --,--.

Column 47, line 1, "claim 2 or" should read --claim 1 or 2--.

Column 48, line 58, "form" should read --for--.
line 59, "lest" should read --least--.

Signed and Sealed this

Tenth Day of November 1998

Attest:

BRUCE LEHMAN

Attesting Officer                Commissioner of Patents and Trademarks